(12) United States Patent
Gutierrez et al.

(10) Patent No.: US 8,612,131 B2
(45) Date of Patent: Dec. 17, 2013

(54) EMERGENCY AND TRAFFIC ALERT SYSTEM

(75) Inventors: Juan Gutierrez, Lakewood, CO (US); Carl Johnson, Denver, CO (US)

(73) Assignee: B&C Electronic Engineering, Inc., Denver, CO (US)

( * ) Notice: Subject to any disclaimer, the term of this patent is extended or adjusted under 35 U.S.C. 154(b) by 111 days.

(21) Appl. No.: 13/080,470

(22) Filed: Apr. 5, 2011

(65) Prior Publication Data

US 2011/0181443 A1 Jul. 28, 2011

Related U.S. Application Data

(63) Continuation-in-part of application No. 12/706,355, filed on Feb. 16, 2010.

(60) Provisional application No. 61/321,399, filed on Apr. 6, 2010, provisional application No. 61/163,588, filed on Mar. 26, 2009.

(51) Int. Cl.
*G06F 17/10* (2006.01)

(52) U.S. Cl.
USPC .......................................................... 701/301

(58) Field of Classification Search
USPC ......................................... 701/400–541, 301
See application file for complete search history.

(56) References Cited

U.S. PATENT DOCUMENTS

| | | | |
|---|---|---|---|
| 2,028,497 A | 1/1936 | Smith, Jr. et al. | |
| 3,235,025 A | 2/1966 | Quinn | |
| 6,028,514 A | 2/2000 | Lemelson et al. | |
| 6,243,027 B1 | 6/2001 | Hill | |
| 6,252,544 B1 * | 6/2001 | Hoffberg | 342/357.31 |
| 6,339,382 B1 | 1/2002 | Arbinger et al. | |
| 6,529,831 B1 | 3/2003 | Smith et al. | |
| 6,614,362 B2 | 9/2003 | Siegel | |
| 6,662,106 B2 | 12/2003 | Evans | |

(Continued)

FOREIGN PATENT DOCUMENTS

| | | |
|---|---|---|
| DE | 10007573 C1 | 9/2001 |
| EP | 1223567 A1 | 7/2002 |

(Continued)

OTHER PUBLICATIONS

International Search Report mailed Jul. 2, 2010; International Application No. PCT/US2010/28572, 8 pgs.

(Continued)

*Primary Examiner* — James Trammell
*Assistant Examiner* — Michael D Lang
(74) *Attorney, Agent, or Firm* — Merchant & Gould, P.C.

(57) ABSTRACT

Systems and methods are disclosed for providing event notification to navigational applications and devices. An event notification system determines whether to send application information to a navigation application or device based upon the proximity of the device to the event. In other embodiments, the event notification system sends all event information to the device and the device determines whether or not to display the information based upon the proximity of the event to the device. User interfaces for displaying event information to a user are also disclosed. Finally, system and methods are disclosed for providing disaster related information to service providers who, in turn, send the disaster information to users of personal navigation devices. For example, information provided may include evacuation routes, shelter locations, disaster recovery centers, hospitals, points of distribution, economic recovery locations, etc.

20 Claims, 15 Drawing Sheets

(56) References Cited

U.S. PATENT DOCUMENTS

| | | |
|---|---|---|
| 6,700,504 B1 | 3/2004 | Aslandogan et al. |
| 6,895,332 B2 | 5/2005 | King et al. |
| 6,924,736 B2* | 8/2005 | Oexmann et al. ............. 340/436 |
| 6,958,707 B1 | 10/2005 | Siegel |
| 7,099,774 B2 | 8/2006 | King et al. |
| 7,099,776 B2 | 8/2006 | King et al. |
| 7,174,154 B2* | 2/2007 | Ehlers ........................ 455/404.2 |
| 7,187,269 B2 | 3/2007 | Ohdachi et al. |
| 7,397,356 B1 | 7/2008 | Johnson |
| 7,609,174 B2 | 10/2009 | Tengler et al. |
| 2001/0038344 A1 | 11/2001 | Garcia |
| 2003/0191568 A1* | 10/2003 | Breed ............................. 701/36 |
| 2004/0243299 A1 | 12/2004 | Scaer et al. |
| 2005/0137786 A1* | 6/2005 | Breed et al. .................... 701/200 |
| 2005/0192746 A1* | 9/2005 | King et al. .................... 701/213 |
| 2005/0267651 A1 | 12/2005 | Arango et al. |
| 2006/0143959 A1 | 7/2006 | Stehle et al. |
| 2006/0184319 A1* | 8/2006 | Seick et al. .................... 701/209 |
| 2006/0229802 A1 | 10/2006 | Vertelney et al. |
| 2006/0241856 A1* | 10/2006 | Cobleigh et al. ............. 701/202 |
| 2006/0242199 A1 | 10/2006 | Cobleigh et al. |
| 2006/0247850 A1 | 11/2006 | Cera et al. |
| 2006/0267783 A1 | 11/2006 | Smith |
| 2007/0103294 A1 | 5/2007 | Bonecutter et al. |
| 2008/0141300 A1* | 6/2008 | Yun et al. ........................ 725/33 |
| 2008/0303660 A1 | 12/2008 | Lombardi |
| 2009/0030605 A1 | 1/2009 | Breed |
| 2009/0043504 A1* | 2/2009 | Bandyopadhyay et al. .. 701/213 |
| 2009/0119014 A1* | 5/2009 | Caplan .......................... 701/213 |
| 2009/0281850 A1 | 11/2009 | Bruce et al. |
| 2009/0319180 A1 | 12/2009 | Robinson et al. |
| 2010/0057338 A1 | 3/2010 | Febonio et al. |
| 2010/0161370 A1 | 6/2010 | Bloom |
| 2010/0250111 A1 | 9/2010 | Gutierrez et al. |
| 2010/0280751 A1* | 11/2010 | Breed ........................... 701/207 |

FOREIGN PATENT DOCUMENTS

| | | |
|---|---|---|
| WO | WO 00/11631 | 3/2000 |
| WO | WO 02/103653 A1 | 12/2002 |
| WO | WO 2004/066240 A3 | 8/2004 |

OTHER PUBLICATIONS

U.S. Appl. No. 12/706,355, Office Action mailed Apr. 30, 2012, 9 pgs.

International Search Report mailed Oct. 23, 2012; International Application No. PCT/US2012/032161, 10 pages.

U.S. Appl. No. 12/706,355, Response to Office Action dated Jul. 30, 2012, 10 pages.

U.S. Appl. No. 12/706,355, Final Office Action mailed Aug. 24, 2012, 10 pages.

* cited by examiner

EMERGENCY AND TRAFFIC ALERT SYSTEM

CROSS-REFERENCE TO RELATED CASES

This patent application is a continuation-in-part of U.S. Provisional Patent Application No. 61/321,399 filed on Apr. 6, 2010, entitled "EMERGENCY AND TRAFFIC ALERT SYSTEM," which is a continuation-in-part of U.S. patent application Ser. No. 12/706,355 filed on Feb. 16, 2010, entitled "EMERGENCY AND TRAFFIC ALERT SYSTEM" which claims the benefit of U.S. Provisional Application No. 61/163,588 filed on Mar. 26, 2009, entitled "EMERGENCY VEHICLE NOTIFICATION SYSTEM", both of which are hereby incorporated by reference.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright. COPYRGT. 2010-2011, B&C Electronic Engineering, Inc.

BACKGROUND

Navigation applications allow a user to map routes. Furthermore, the incorporation of GPS units and navigation applications provide users to get turn by turn directions from such application when operating a moving vehicle. Furthermore, navigation applications have evolved to provide rudimentary traffic information to users. However, current navigation applications fail to offer more information than a general sense of the traffic conditions, such as emergency event notifications. It is with respect to these and other considerations that embodiments of the systems and methods described herein have been made. Also, although relatively specific problems have been discussed, it should be understood that systems and methods described herein should not be limited to solving the specific problems identified in the background.

SUMMARY

Embodiments of this disclosure describe technology for the driving public, including the hearing impaired, that will enable them to safely drive and receive timely information that will keep them far safer than in the past. Additionally, emergency responders will enhance their ability to move efficiently through traffic.

Further embodiments of the present disclosure expand upon the framework of the disclosed emergency vehicle notification systems and methods to provide other useful information to drivers to help them in avoiding traffic and/or traffic related accidents or incidents. For example, embodiments of the present disclosure can further provide information to drivers regarding scheduled incidents such as, but not limited to, races, road maintenance, marathons, parades, fairs, and/or neighborhood events as well as unscheduled events such as segments of traffic signal failure, water or sewer main breaks, flooded streets, downed wires, street repairs, construction, work by public utility companies, work by private contractors, etc. Although specific examples of scheduled and unscheduled incidents have been provided, one of skill in the art will recognize that such examples are provided as illustrative uses of embodiments of the present disclosure and that other scheduled and unscheduled incidents, not explicitly detailed in the present disclosure, are contemplated within the scope of this disclosure. Still, further embodiments contemplated within the present disclosure provide useful information to drivers in case of emergencies.

In yet another embodiment, the systems and methods disclosed herein may be used to gather disaster related information from a disaster management agency, such as but not limited to the Federal Emergency Management Agency ("FEMA") and distribute the disaster related information to the public via computers, GPS, and/or personal navigation devices. The embodiments disclosed herein can be leveraged to address concerns before, during, and after a disaster event. In still further embodiments, the systems and methods disclosed herein may be used to determine who should receive disaster related information.

In another embodiment, the systems and methods disclosed herein may be used to determine what navigation applications and/or devices should receive event notification information. In such embodiments, the navigation system determines whether a device is in a related proximity to an event or asset (e.g., a police car, fire truck, ambulance, etc.) If the device is in relative proximity, the navigation component sends event and/or asset information to the device.

In yet another embodiment, the systems and methods disclosed herein may be used to determine whether a device should display event or asset information. For example, a device may receive information related to events or assets. The device determines whether each event or asset is within a related proximity. If the event or asset of is within the related proximity, the device displays information related to the event or asset. Various user interface embodiments that may be employed with the systems and methods are also disclosed.

This summary is provided to introduce a selection of concepts in a simplified form that are further described below in the Detailed Description. This summary is not intended to identify key or essential features of the claimed subject matter, nor is it intended to be used to limit the scope of the claimed subject matter.

BRIEF DESCRIPTION OF THE DRAWINGS

Embodiments of the present disclosure may be more readily described by reference to the accompanying drawings in which like numbers refer to like items and in which.

DETAILED DESCRIPTION

Figure 1:
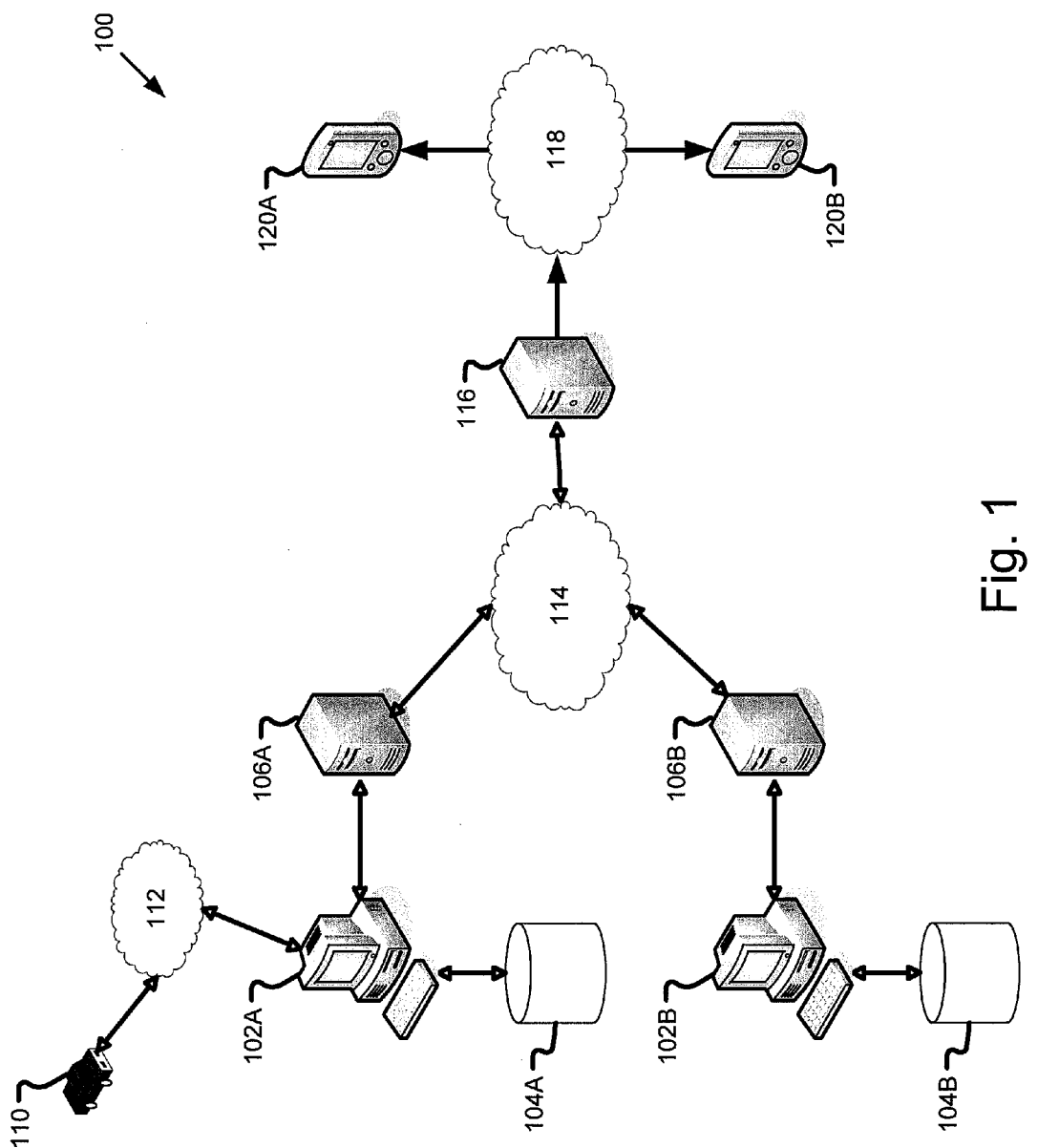
FIG. 1 is an illustration of an embodiment of a system operable to provide event notifications.

This disclosure more fully describes exemplary embodiments with reference to the accompanying drawings, in which some of the possible embodiments are shown. Other aspects, however, may be embodied in many different forms and the inclusion of specific embodiments in the disclosure should not be construed as limiting such aspects to the embodiments set forth herein. Rather, the embodiments depicted in the drawings are included to provide a disclosure that is thorough and complete and which fully conveys the intended scope to those skilled in the art. When referring to the figures, like structures and elements shown throughout are indicated with like reference numerals.

With the amount of travel demanded on most of us on a daily basis, regardless if it is for work or pleasure, we are finding ourselves driving more miles every year than ever before. Every time we get in our vehicles we increase our exposure to the elements and dangers of any traffic commute. These elements have been concentrated on our exposure to our own driving habits as well as the unknown driving habits of other drivers. Some of the potential causes of auto accidents that we concentrate on are the obvious, such as, traffic volume, weather conditions, time of day or night, level of alertness, etc.

One aspect that is now getting its due recognition is how well our vehicles are now being built related to its insulation factor. Vehicles are more insulated to keep us warmer in the winter and cooler in the summer, as well as eliminating engine, tire and road noise from inside the vehicles. Add to the insulation factor normal internal noise from heating and air conditioning fans, radio, CD, MP3 players, and cell phone conversations, and we find ourselves totally insulated from all the exterior noises, some of which may be vital for us to drive in a safe manner.

One such factor that we may be unwillingly removing from our attention span is that of emergency vehicles (police, fire, and ambulances) approaching the driving public from any direction. Whenever any of these emergency vehicles approach us from the front, we depend on line of sight to identify their direction of travel and anticipate their travel route. However, oftentimes we may only hear an emergency vehicle that is already close behind us in the rear view mirror. Maybe even more dangerous is an intersection where we encounter an emergency vehicle at an angle and never hear their warning siren. This is particularly more evident during the day when flashing lights are not as visible as they are at night.

One other group of drivers that we as a society have not taken into consideration when addressing our driving public is the deaf and hearing impaired drivers. This is a group of approximately fifteen percent (15%) of the general population, and they are as active drivers as the other eighty-five percent (85%).

Embodiments of this disclosure describe technology for the driving public, including the hearing impaired, that will enable them to safely drive and receive timely information that will keep them far safer than in the past. Additionally, emergency responders will enhance their ability to move efficiently through traffic.

Every year innocent citizens are killed and/or seriously injured by responding emergency vehicles and police chases. Police agencies are faced with the dilemma of letting dangerous criminals get away from them, or risk a chase. It is during these types of events that the emergency vehicle notification system will help warn the driving public far out in front of a chase that they need to be extra cautious, and should pull over and stop at all intersections.

Further embodiments of the present disclosure expand upon the framework of the disclosed emergency vehicle notification systems and methods to provide other useful information to drivers in order to help them avoid traffic and/or traffic related accidents. For example, embodiments of the present disclosure can further provide information to drivers regarding scheduled non-emergency events such as, but not limited to, races, road maintenance, marathons, parades, fairs, and/or neighborhood events as well as unscheduled non-emergency events such as segments of traffic signal failure, water or sewer main breaks, flooded streets, downed wires, street repairs, construction, work by public utility companies, work by private contractors, etc. Although specific examples of scheduled and unscheduled non-emergency events have been provided, one of skill in the art will recognize that such examples are provided as illustrative uses of embodiments of the present disclosure and that other types of emergency and/or scheduled and unscheduled non-emergency events, not explicitly detailed in the present disclosure, are contemplated within the scope of this disclosure. Still, further embodiments contemplated within the present disclosure provide useful information to drivers in case of emergencies other than police, fire, or medical emergencies. For example, in such embodiments, the systems and methods disclosed herein detect an emergency event and display appropriate route information to the driver. For example, in the case of a disaster or storm, the disclosed systems and methods may display evacuation routes, snow routes, flooded routes, information regarding hazardous materials, etc.

Embodiments of the present disclosure will now be illustrated with respect to the disclosed figures. FIG. 1 is an illustration of an embodiment of a system 100 for providing event notification. In embodiments, system 100 is operable to identify potential traffic interruptions due to emergencies situations, such as a police emergency, a fire emergency, a hazardous material emergency, severe weather, natural disasters, etc. In further embodiments, system 100 is operable to identify potential traffic interruptions due to non-emergency situations (whether scheduled or not) such as marathons, races, parades, neighborhood events, traffic light outages, water or sewer main brakes, flooded streets, downed wires, construction performed by public utilities and/or private contractors, etc. In still further embodiments, system 100 is additionally operable to identify the severity of the traffic interruption by determining the severity of the event by, for example, associating the event with a severity level. System 100 is further operable to transmit information related to such events to drivers thereby informing the drivers of the events and directing the drivers away from them.

System 100 may include an event recording client 102 that records events on an event datastore 104 communicatively connected to the event recording client 102. Although event datastore 104 is illustrated as separate from event recording client 102, one of skill in the art will appreciate that, in alternate embodiments, event datastore 104 may reside on the same machine as event recording client 102 (e.g., the event data store may be the hard drive associated with event recording client 102). In an embodiment, event recording client 102, such as event recording client 102A, may be a Computer Aided Dispatch ("CAD") client used by, for example, a police dispatcher, a fire dispatcher, a 911 dispatcher, etc. CAD systems are known in the art and any suitable system or system with similar capabilities may be used. A user of event recording client 102A receives an emergency call and logs an event corresponding to the emergency which is stored in event datastore 104A. In embodiments, the event may be identified by a unique client event ID when storing the event occurrence in the event datastore 104.

Other event information may be associated with the event and stored in the event datastore 104. For example, other event information may include, but is not limited to, a type of event, a description of the event, a location of the event (e.g., the latitude and longitude coordinates of the event), a severity level, or any other type of information related to the event. Furthermore, any of the event information may be updated and stored in the event datastore 104 during the course of the event thus providing a dynamic event recording system. As an example, event recording client 102A may be a CAD client recording used by a 911 dispatcher to record a police related event such as a traffic accident, a burglary, a shooting, a riot, etc. A severity level may be associated with the police event (e.g., a level rated from 1-10, with 10 being the most severe) that may depend upon the type of police event being recorded. In one embodiment, the severity level of the event may be predetermined according to the type of police event. In another embodiment, the dispatcher recording the event may manually set the severity level based upon the specific details of the event. In alternate embodiments, a different scale may be used for the severity level. For example, a dispatcher recording an event related to a fire may have only two levels (e.g., emergency or non-emergency). Although the present disclosure provides specific examples of event types and severity levels, one of skill in the art will appreciate that any number of different event types and/or severity levels may be used. For example, federal, state and/or local agencies (e.g., a fire department, a parks and recreation department, a water district, a public works division, etc.) may maintain their own recording client 102 and the database 104 in order to record their own unique events having their own unique event data. Alternatively, a standardized system may be shared by multiple agencies.

In embodiments, the user (e.g., a dispatcher) entering event information at event recording client 102 may assign one or more assets 110 to the event. For example, referring again to the police event previously described, a dispatcher recording the event may assign one or more assets 110 to respond the police emergency. The one or more assets 110 may be emergency vehicles such as police cars, fire trucks, ambulances, hazardous material units, etc. In further embodiments, the assets need not be vehicles but may be individual emergency responders (e.g., police officers, firefighters, etc.). In order to track the assets assigned to an event, the assets may be identified by a unique asset ID and associated with the event ID corresponding to the event the asset is assigned to. In such embodiments, information regarding the assets assigned to the event is also stored in an event datastore 104, such as event datastore 104A.

In further embodiments, assets 110 may be equipped with an Automatic Vehicle Locator ("AVL") or some other location component that provides the real-time location of the asset. The AVL allows the event recording client 102 and/or event datastore 104 to monitor an assets location thereby helping a dispatcher decide which asset(s) should be assigned to the event. In further embodiments, the assets vehicles may also have an AVL computer installed next to the driver (in the case where the asset is a vehicle) or carried as a personal device (in the case where the asset is an individual). The computer has the capability of receiving "notes" from the dispatcher and updates related to their emergency. Additionally, they can also monitor the position of other emergency vehicles within their agency (fire, police or ambulance) in the area regardless whether they are responding to emergency calls or not. In further embodiments, the location component may track additional data related to the asset and transmit the additional data to an event notification system 102 and/or event datastore 104. Other asset information may include, but is not limited to, whether an emergencies vehicle's warning lights are on or off, whether a siren is on or off, wheel rotation, the asset's status, etc.

The asset 110 may transmit its location information (using a location component, such as the AVL) to an event recording client 102 and/or event datastores 104 via a network 112. In embodiments, network 112 may be any type of network capable of transmitting data such as a wide area network ("WAN"), a local area network ("LAN"), the Internet, a cellular network, satellite network, or any other type of data network known in the art. In such embodiments where the asset 110 is equipped with a GPS component, the real-time location of the asset may be continually updated and stored with the asset information in the event datastore 104. However, in some situations it may not be desirable for an asset 110 to provide its real-time location. For example, a police vehicle responding to the scene of a crime may not want its location visible to others. Thus, alternate embodiments are provided where the asset can indicate that its location should not be transmitted. In such embodiments, the real-time location of the asset may or may not be provided to event datastore 104, however the location of the asset will not ultimately be displayed on the personal navigation device 120 (discussed in more detail below). While embodiments of the present disclosure describe the event datastore 104 as storing both client event and asset information, one of skill in the art will recognize that a separate datastore may be utilized in storing different types of event information without departing from the scope of the systems and methods disclosed herein.

Event notification system 100 also includes one or more event notification components 106. In embodiments, event notification components 106 are communicatively coupled to event recording clients 102 and/or event datastores 104. In one embodiment, event notification components 106 may be co-located with and directly connected to event recording clients 102 and/or event datastore 104. In another embodiment, event notifications components 106 may be remote systems connected to event recording clients 102 and/or event datastores 104 via a network such as, but not limited to, the Internet. In still further embodiments, event notification components may be a software component installed on event recording clients 102 and/or event datastores 104.

In embodiments, event notification components 106 are operable to gather information related to an event from an event datastore, such as event datastore 104A. The collected client information may include, but is not limited to, event IDs, event types, event severity levels, event location, etc. Referring again to the example of a police event, event notification components 106 may gather the unique client event ID, event type, the date of the event, and location of the event, which may be identified by GPS Latitude/Longitude coordinates, an address, etc. In still other embodiments, event notification components 106 are further operable to gather asset information from event datastores 104. Asset information may include a client asset identifier, the observation date (e.g., the date when the asset data was generated), the speed that the asset is traveling, the heading of the asset (for example, the heading may be identified by the cardinal direction the asset is travelling or reported in degrees, e.g., 0-369 degrees where 0 degrees is North), the asset's destination (which may be determined based on a client event ID associated with the asset, e.g., the event to which the asset has been assigned by the dispatcher) and the location of the asset (as identified by GPS latitude and longitude coordinates or by some other equivalent method).

The event and/or asset information may be gathered and continually updated by the event notification component 106 using a push system, a pull system, by continuously polling event recording clients 102 and/or event datastores 104, by receiving an interrupt indicating that there is new data from event recording clients 102 and/or event datastores 104, or by any other method of gathering information known to the art. In embodiments, the event component 106 is associated with a separate datastore (not shown) that it uses to store information related to active events.

An event notification component, such as event notification component 106A, may be operable to package and/or process relevant event and/or asset information and transmit the processed information to a navigation provider 116 via a network 114. For example, the event notification component 106A may standardize, translate or alter the format of the client information for use by downstream systems. This may include assigning a new unique ID for use by the notification system to each client event and asset, translating the client-provided security level into a format expected by downstream systems, generating a new severity level for use by the notification system based on the client-provided event information (e.g., client security level, number of assets assigned, event type, etc.), and converting client-provided location information into a form suitable for use by the downstream systems.

In embodiments, network 114 may be any type of network capable of transmitting data such as a wide area network ("WAN"), a local area network ("LAN"), the Internet, a cellular network, satellite network, or any other type of data network known to the art. In embodiments, navigation provider 116 may be any type of navigation service provider that provides navigation and/or traffic related information to application service providers such as, but not limited to, Bing Maps, Google Maps, MapQuest, Garmin, Magellan, and/or TomTom. Navigation provider 116 receives the event and/or asset information from the event notification component 106 and processes the information in order to prepare the information for delivery to an application service provider. For example, navigation provider 116 may translate the information into a data format compatible with a particular application or device. As previously discussed, event notification components 106 may receive event notification from many different systems that may use disparate severity levels. Because of this, navigation provider 116 may process the received event information taking into account other information, such as traffic flow information, current traffic patterns, other traffic incidents within the proximity of the event, rush hour data, etc. to adjust received severity level information into a severity level that is standardized by the navigation provider 116 such that it is compatible with the application services.

In further embodiments, navigation provider 116 may generate instructions and/or commands for the various navigation applications and/or devices. Such commands may include, but are not limited to, displaying the location of an event on a map, displaying a traffic flow on a map, displaying an emergency vehicle on a map, calculating alternate routes for a user, etc. One of skill in the art will appreciate that the information received by navigation provider 116 may be used to perform various navigation and/or traffic operations known to the art. In alternate embodiments, such processes may be performed by event notification component 106 and prior to transmitting information to the navigation provider 116. In yet another embodiment, the generation of instructions and commands may be performed by the individual application service providers (not shown in FIG. 1) who receive event information from the navigation provider 116 before sending the commands to the personal navigation devices 120.

Navigation provider 116 is further operable to package and transmit information received from the event notification components 106 to application service providers that present navigation information on individual personal navigation devices 120. In alternate embodiments, navigation provider 116 may include additional logic such that it only sends information and/or commands to specific personal navigation devices 120. For example, individual personal navigation devices 120 may be equipped with GPS functionality identifying the location of the personal navigation device 120. Navigation provider 116 may send information related to an event and/or asset information only to personal navigation devices 120 within a certain proximity to the event and/or asset. In other embodiments, a personal navigation device 120 may be programmed with a specific route. In such embodiments, navigation provider 116 may only transmit event and/or asset information to navigations components 120 whose routes intersect with the event and/or asset location. While the disclosure presents an embodiment in which the application service commands are generated by the navigation provider, in alternate embodiments, these commands may be generated by specific application service servers (not displayed in FIG. 1) prior to being transmitted to the personal navigation devices 120. Although only two personal navigation devices 120 are illustrated in FIG. 1, one of skill in the art will appreciate that navigation provider 116 may transmit the information and or commands, either directly or via one or more application service providers, to any number of personal navigation devices 120.

In embodiments, personal navigation devices 120 include, but are not limited to, computing devices such as GPS systems, computers, laptops, tablet computers, cell phones, smart phones, PDAs, or any other device capable of executing and displaying navigation applications. Personal navigation devices 120 may include a display for presenting a user interface that displays traffic and/or route information to a user. In further embodiments, the user interface may display additional information such as a severity level associated with the event, for example, by color coding the event location according to the severity level, the type of the event, for example, by displaying a specific icon associated with an event type, or any other event related information as graphic or textual information. Furthermore, in alternate embodiments, the user interface is operable to display route information or alternate route suggestions to help a user avoid an event. For example, a personal navigation device 120 may alert the user to the approach of an emergency vehicle asset en route to an event. In still further embodiments, the personal navigation device 120 may include an audio component, such as, but not limited to, an audio output component (e.g., a headphone jack, speaker jack, a wireless connection component capable of connecting to audio devices, etc.) or equipped speakers in order to provide users with audible information.

The personal navigation devices 120 may also provide additional information to a user informing the user of approaching emergency vehicles. For example, the user interface could provide a specific message alerting the user such as "Emergency Vehicle Approaching from the Rear", or "Emergency Vehicle Approaching from the North/East/South/West", etc. Furthermore, an icon representing the emergency vehicles may be displayed on the user interface of the personal navigation devices 120 alerting the user to the real-time location and direction of travel of the emergency vehicle. In other embodiments, the personal navigation devices may also provide instructions to the user notifying the user to pull over to allow the emergency vehicle to safely pass. In such embodiments, the personal navigation device 120 may take into account the type of the road the user is on in order to provide specific directions on how to allow the emergency vehicle to safely pass. For example, if the user is on a two way street or highway, the user may be directed by a message such as "Pull over to the right" to allow the emergency vehicle to pass. If the user is on a one way street or a divided highway pulling over to the right may not be the best option. In such instances, the user may simply receive a message to "Pull over" allowing the user to make the best decision as to which direction to pull off to the side.

The logic to determine which notifications to send the user (e.g., depending on the location or type of road the user is traveling on) may be implemented by hardware or software located at the personal navigation device 120, the navigation provider 116, or any other component. In other embodiments, the navigation provider 116 may send messages to the personal navigation device 120 which include information related to the type of the asset, the direction the asset is travelling, alert messages notifying the user of an approaching emergency vehicle, instructions on avoiding an emergency vehicle, navigational directions, the location of an incident, the type of an incident, or any other type of message providing information relevant to the various embodiments disclosed herein. The personal navigation device 120 may provide the information related in the messages from the navigation provider 116 to a user via a user interface.

In further embodiments, the user interface is capable of displaying the real-time location of assets based upon information received from event components 106 and navigation providers 116. The responding asset may be generically represented on the user interface or the type of asset may be identified by the user interface by displaying a specific icon related to the asset type (e.g., the personal navigation device may display different unique graphical identifies for police cars, fire trucks, ambulances, etc). In further embodiments, the user interface may provide more detailed information related to the asset 110 such as, but not limited to, the direction the asset is traveling, the route the asset is following, the lane the asset is traveling, etc. The information displayed by the user interface of the personal navigation device 120 provides users with the ability to avoid events and or assets (such as, emergency vehicles) thereby alleviating traffic and reducing accidents related to events.

Embodiments of FIG. 1 have been described with respect to relaying information related to an emergency event recorded by a dispatcher using a CAD client, such as a 911 dispatcher; however, other embodiments of the present disclosure are operable to transmit information related to traffic events that may arise from non-emergency situations. Notification components 106 may also be in communication with event recording clients 102 and event datastores 104 associated with other public and/or private agencies or entities that record information related to traffic events. For example, notification components 106 may be associated with event recording clients 102 and event datastores 104 associated with various public works scheduling entities, such as, but not limited to public and/or private traffic engineering entities, wastewater entities, construction entities, and water entities. Event recording clients 102 and event datastores 104 associated with such entities may store additional information that relate to non-emergency events that have an effect on traffic situations such as information related to parade routes, race and/or marathon routes, traffic light outages, road construction, waterline breaks, evacuation routes, snow routes, etc. Event notification components 106 associated with such entities may gather and package event information from the public and private entities and transmit the information to navigation provider 116. Navigation provider processes the non-emergency event information and transmits the information and commands to personal navigation devices 120 for display to a user as previously described.

In yet another embodiment, the event notification component 106 may be employed with an event datastore 104 associated with a railroad operator. In such embodiments, the components described herein with respect to FIG. 1 may be used to provide information to a user detailing when a train (or other railroad asset that may have an impact on traffic) is approaching a train crossing. In such embodiments, the location of the train or other asset may be tracked by equipping it with a location component such as an AVL. In some embodiments trains may be equipped with two location components, one at the front of the train and one at the rear of the train. Equipping a train with two location components allows the disclosed systems to determine the span of the train which allows for a determination of what intersections are blocked by the train. Additionally, in the instance of a train accident, emergency responders will be able to quickly tell what intersections are blocked by the non-moving train which will allow the emergency responders to quickly coordinate their positioning around the accident. In other embodiments, the length of the train may be known to the disclosed components. In such situations, the span of the train may be calculated without the need for a second location component at the rear of the train. Furthermore, the embodiments disclosed herein may further be operable to recalculate a route for a user which allows the user to avoid waiting at a train signal crossing by avoiding the train's path.

While the embodiments described with respect to FIG. 1 have been illustrated such that individual event components 106A and 106B are associated with individual event recording clients 102 and datastores 104, one of skill in the art will appreciate that system 100 may also be organized as a hub-and-spoke system, in which a single event component 106 is communicatively coupled to multiple event recording clients 102 and event datastores 104. Additionally, one of skill in the art will further appreciate that the system described with respect to FIG. 1 is further extendable to incorporate any number of event recording clients 102, event datastores 104, and event components 106.

As displayed in the event notification system 100, a navigation provider may receive various different events from disparate sources. In some cases, two different sources may each provide separate event information identifying what is actually a single event as two distinct events. For example, a police dispatcher may indicate an event corresponding to a car accident that police units are responding to while an emergency medical service ("EMS") dispatcher may identify the same accident as a separate event by entering the accident into the EMS system and is dispatching an ambulance to the scene. In one embodiment, the system 100 may simply present the two events to the application service providers and/or personal navigation devices 120 independently as separate events without any attempt to correlate the two events based on location. Both events would then show up on the personal navigation device 120, thereby giving the user additional information of the seriousness of the event at that location. In another embodiment, either the navigation provider or the event notification components may perform a conflict resolution based on the temporal and physical proximity of the events being reported by the two event recording clients 102. For example, the system may recognize that the two events have the same location and therefore determine that they are the same event. In that case, the system may choose to use a single notification system event ID for all event information regardless of source for this location. In this way multiple client event IDs from different event notification clients may be associated with a single unique system event ID generated by the event notification component 106 or, alternately, by the navigation provider 116. In yet another embodiment, the system 100 may disregard any duplicative events reported, in favor of reporting only one event for any given time and location. The choice of which event to report may be made by time (e.g., report the first event received), by severity, by priority (e.g., the events of one agency may have a higher priority than another), or by simple random selection.

In other alternate embodiments, the event notification system 100 may be implemented by incorporating the event notification component 106 into existing dispatch systems that perform the functions of the event recording client 102 and event datastore 104. Such implementations allow existing dispatch system to be retrofit to allow event data to be automatically transmitted in real-time to navigation applications without changing existing dispatch procedures. In other embodiments, the event notification component 106 may or may not be co-located with the dispatch system and may or may not independently store event data. For example, for security reasons, some police departments may allow real-time dissemination of limited data to navigation applications but may not want any data stored outside of their secured network. If the notification component is co-located, it could store data within, or utilize data stored within, the secured network. If the notification component 106 is remotely located, data could be handled transitorily such that only current event data is available at any time.

Figure 2:
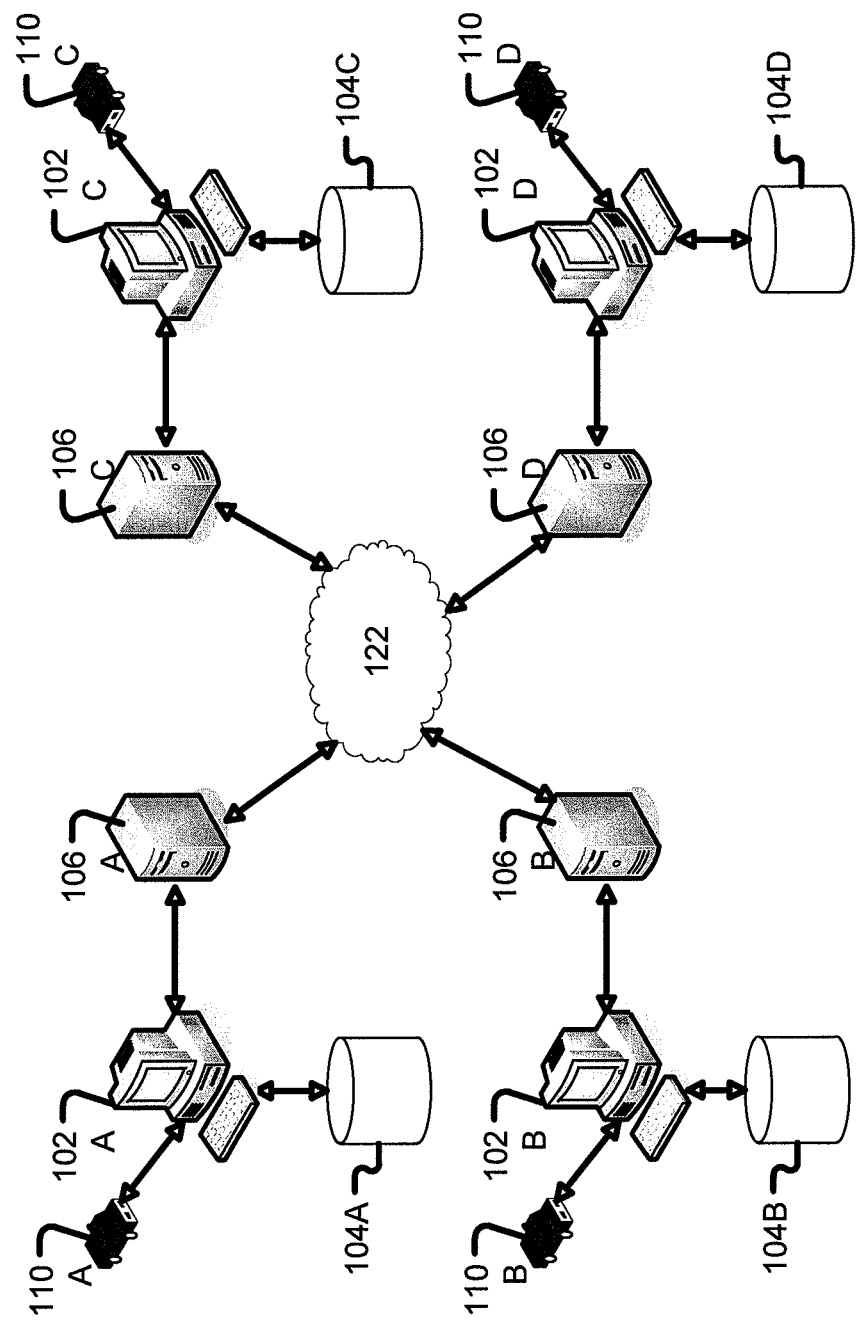
FIG. 2 is an illustration of an alternate embodiment of a system operable to provide event notifications.

FIG. 2 is an illustration of an alternate embodiment of a system 200 operable to provide event notifications. As illustrated in FIG. 2, multiple event notification components (e.g., event notification components 106A-106D) may communicate across a network 122. Network 122 may be any type of network capable of transmitting data such as a wide area network ("WAN"), a local area network ("LAN"), the Internet, a cellular network, satellite network, or any other type of data network known to the art. Each event notification component may communicate with assets (e.g., assets 110A-110C) associated with the event notification components. As shown in FIG. 2, event data may be transmitted across a closed system between event notification components 106 and dispatch systems 102 of different departments/agencies.

For example, event notification components located at a 911 dispatch, a police dispatch, a fire dispatch, and/or an EMS dispatch may communicate with one another and exchange information related to the events recorded at the different dispatch locations. In the closed embodiments, more detailed information may be transmitted between the different locations because, unlike the embodiments where some event information is or could potentially be made public, it may be more desirable for different agencies to share more information. For example, the additional information may include an asset ID, a unit ID, a rig ID, the identity of the responding units, information about the personnel and emergency responders at the scene, information related to the agencies at or responding to the incident, the identity and/or location of the incident commander, the location of the incident command post, or any other information relevant to the incident, the personnel, and/or the emergency responders. Such information may be available by passing the information between the event notification components (e.g., event notification components 106A-106B). In other embodiments, all the information may be centralized by a National Incident Management System ("NIMS") that may be connected to the system illustrated in FIG. 2 (not shown) and distributed among the various agencies via the embodiments disclosed with respect to FIG. 2. The closed embodiments disclosed provide for increased cooperation and efficiency among the different agencies responding to the scene. Such embodiments are particularly beneficial with respect to Homeland Security incidents when many different agencies are responding to the same incident by providing a way for the agencies to communicate their positioning and information among each other. The closed system of FIG. 2 further provides a dynamic system for continually updating information between agencies responding to an incident as information changes.

Similarly, other public and private agencies may participate in the closed notification system illustrated in FIG. 2. While FIG. 2 describes an embodiment with multiple event notification components 106, one of skill in the art will appreciate that alternate embodiments of FIG. 2 may be practiced in which the system is organized in a hub-and-spoke manner using a single event notification component 106.

The embodiments illustrated in FIGS. 1 and 2 are examples of two different tiers of services that may be provided by the systems and methods disclosed herein. As described in FIG. 1, an event notification system can be extended to the public by publishing event notification to personal navigation devices 120. At the same time, the different event notification components 106 can communicate amongst each other to exchange more detailed information between the various agencies or entities employing the event notification systems and methods disclosed herein.

Figure 3:
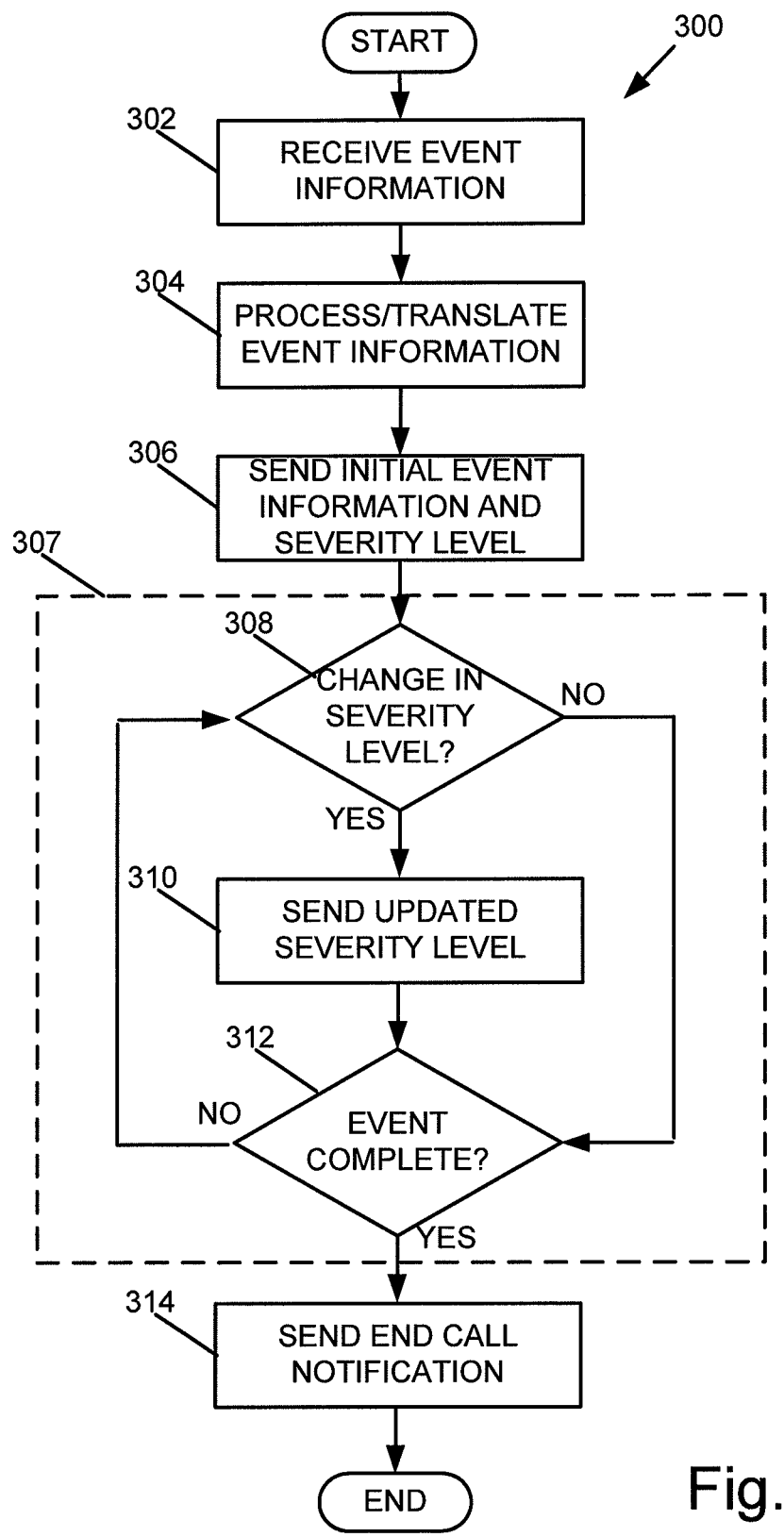
FIG. 3 is a flow chart representing an embodiment of a method for providing emergency event information.

Referring now to FIG. 3, FIG. 3 illustrates a flow chart representing an embodiment of a method 300 for providing emergency event information. Flow begins at operation 302 where the emergency event information is received. In embodiments, an event component, such as event component 106 (FIG. 1) receives event information from an event datastore, such as event datastore 104 (FIG. 1). In one embodiment, the event component receives event information including an event ID, a location of the event, and a severity level associated with the event. In such embodiments, the location of the event may be the latitude and longitude coordinates of the event. In another embodiment, the location of the event may be an address or an intersection. In alternate embodiments, an event component may receive additional event information other than an event ID, location, and severity level at operation 302.

Assets (e.g., police units, fire trucks, ambulances, etc.) are assigned to handle emergency events. Thus, in further embodiments, the event component also receives information related to the assets assigned to the event at operation 302. In embodiments, assets are assigned to an event by being correlated with the event ID. Thus, the event component may receive asset information for each asset associated with the event ID received in operation 302. In embodiments, asset information received by the event component may include, but is not limited to, an asset ID, an asset type, the real-time location data of the asset (identified by its latitude/longitude coordinates), the speed at which the asset is traveling, and/or the heading the asset is traveling. Assets may be treated and reported as an event in and of themselves independent of any location-specific event (that is as an event that is moving over time) or, alternatively, may be associated with a location-specific event and reported as an associated asset so that the application provider and/or end user is able to distinguish between moving assets and events. The asset information may be transmitted by a location device located on the asset. In one embodiment, the location device may be capable of transmitting asset information (e.g., location, speed, direction of travel, etc) as well as receiving information from the disclosed systems and methods (i.e., location of other assets, location of incident, etc). In another embodiment, a separate device may be used to receive information from the disclosed systems and methods.

Flow proceeds to operation 304 where the severity level and other client-generated information are processed for use by downstream components. For example, in embodiments the system may change the severity level received at operation 302 to a severity level compatible with the event notification component, the navigation provider, such as navigation provider 116 (FIG. 1), or other downstream system. As described with respect to FIG. 1, the embodiments disclosed herein are capable of receiving event information from various types of event sources having their own systems and event recording clients (e.g., a CAD client, a public works agency, etc). Each event recording client may assign different severity levels to the events they record. Therefore, to ensure uniformity, the severity level may be standardized such that it is compatible with the event notification component, a navigation provider, or application service provider. In one embodiment, a new severity level is calculated as a function of the number of assets assigned to the event, the type of the event, the level of severity received, and the number of assets at the scene of the event. In further embodiments, additional information such as the location of the event, current traffic flow data, or any other information available to the components disclosed herein may be used in localizing severity. For example, if the event is in a location that normally receives a high amount of traffic, the localized severity level may be increased. Conversely, if the event is in a low traffic area, the localized severity level may be decreased. One of skill in the art will appreciate that methods and information other than the examples provided with respect to operation 304 may be employed for severity localization.

In embodiments, operation 304 also includes performing a general translation operation on the information received (e.g., the event ID, the asset ID, the location, etc.) at operation 302. For example, the translation operation may include generating a second event ID that is unique to the event component and/or the navigation provider. It may be necessary to translate the event asset ID to ensure that the ID's are in a form that is compatible with the notification component and the navigation component. As discussed, the event notification component and the navigation component are capable of receiving event information from a variety of event recording clients and datastores. Each event recording client may have its own unique way of identifying event ID's, asset ID's, and location. Thus, it may be necessary to translate the received information into a form that is compatible with the notification component and or navigation provider's operation. Furthermore, generating new event and asset IDs at operation 304 provides the benefit of ensuring that all the disparate information received by the notification component is uniquely identified despite the fact that the information may be received from a variety of different sources. An additional benefit is provided by translating the asset IDs at operation 304. Translation of the asset IDs helps to maintain the anonymity of the assets assigned to the event. This may be required, for example, by a police department participating in the event notification system disclosed herein.

Furthermore, it should be noted that multiple information processing operations (not shown) may be performed, such as by different components of the overall system. For example, the event notification component 106 may generate a new standardized severity level for each event based on information, including the client-assigned severity, from the dispatch system. This severity level may then be further adjusted (localized) by the navigation provider based on local traffic flow information which is available to the navigation provider but not available to the event notification component. This allows the system, for example, to report what would otherwise be identical emergencies (in terms of event type, number of assets assigned, etc.) as having different severities based on the location of the event (e.g., when one event occurs at a very busy freeway while the other event occurs on an infrequently traveled agricultural road.

After the information has been processed, flow proceeds to operation 306 where the event component sends the processed event information to a notification provider. The information sent at operation 306 will be used to generate information to be displayed to the user via a personal navigation device, such as personal navigation device 120 (FIG. 1). In embodiments, operation 306 further entails continuously sending real-time location information for all assets assigned to the event.

After the initial event has been reported, the system then enters a monitor and update mode illustrated by the dashed box 307 which monitors for changes in the event in order to revise the severity level as conditions change. In the monitoring and updating operation 307, flow proceeds to operation 308 where the event component determines if there is a change in the severity level based on new information about the event as it is obtained. The determination of a change in severity level will be further described with respect to FIG. 4. If there is a change in the severity level, flow branches YES to operation 310. At operation 310, updated severity information is sent to the notification provider and flow proceeds to operation 312. Referring back to operation 308, if there is no change in the severity level, flow branches NO to operation 312.

At operation 312, the event component determines if the event has ended. In one embodiment, the event component determines that the event has ended when it receives notification that the event has terminated from the event datastore. Additional embodiments of a method for determining if the event has ended are described with respect to FIG. 4. If the event has ended, flow branches YES to operation 314. At operation 314, an end call notification is sent to the notification provider indicating that the event has terminated and that it can be removed from navigation applications. If the event has not ended, flow branches NO to operation 308 and flow continues until the event has ended.

The reader will understand that the method described in FIG. 3 is a real-time method in which data describing current conditions are streamed to the navigation applications. The event component that streams the current condition may be simply passing on some or all of the information obtained from an event recording client or database. In other situations, such as scheduled events like as races, the event notification component may be generating current information based on the data describing the schedule (e.g., based on data stating a road will be closed from 10 until 4, at 10 the event notification component may begin generating real-time information indicating that the road is closed). Further detail on providing information for scheduled events is discussed with respect to FIG. 5.

Figure 4:
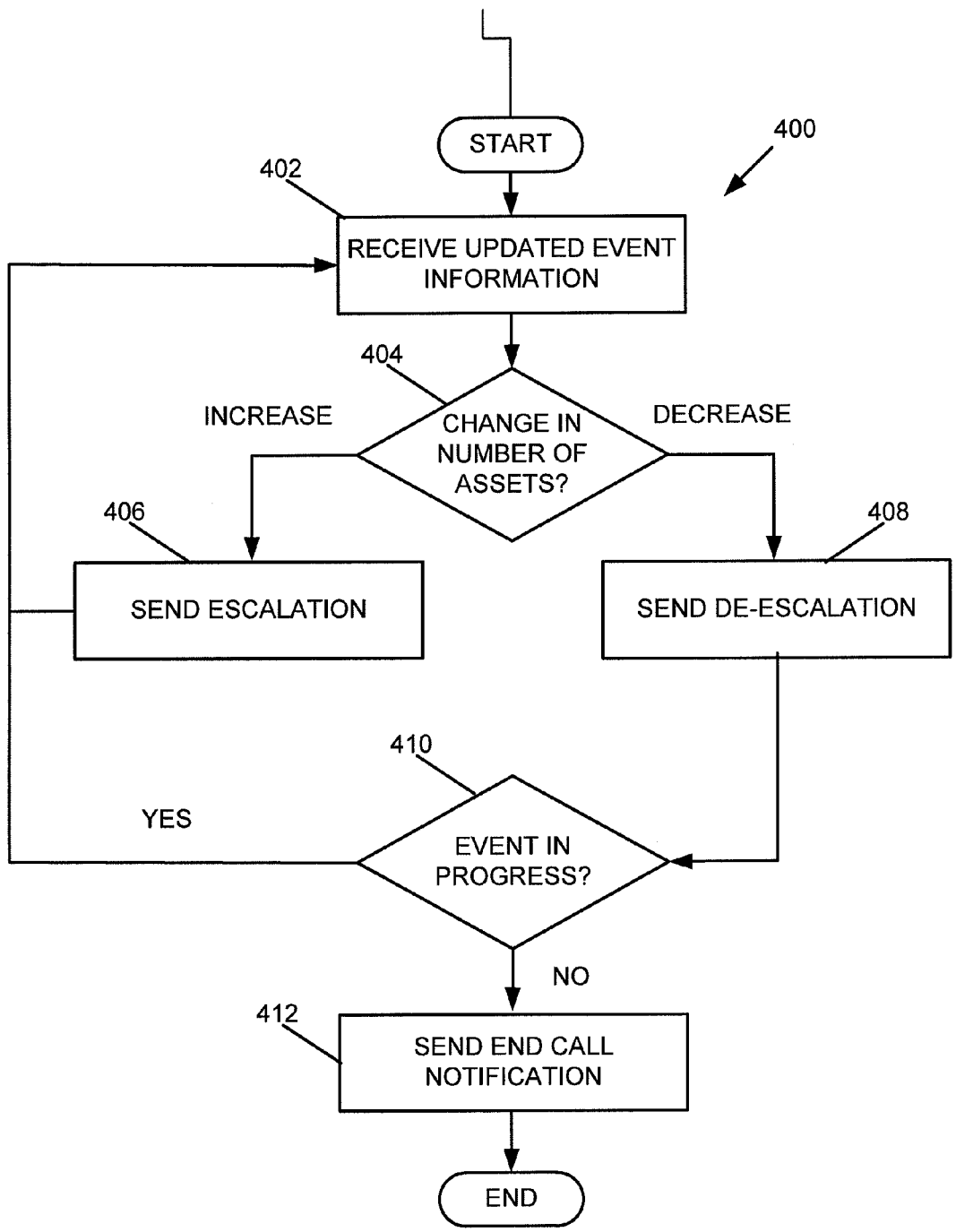
FIG. 4 is a flow chart illustrating an embodiment of a method for determining whether there is a change in the severity level during an active emergency event.

FIG. 4 is a flow chart illustrating an embodiment of a method 400 for determining whether there is a change in the severity level during an active emergency event. Flow begins at operation 402 where an event component, such as event component 106 (FIG. 1) receives updated event information from an event datastore, such as event datastore 104 (FIG. 1). Flow proceeds to operation 404 where the event notification component determines if there has been a change in the number of assets assigned to the event. This may occur when a dispatch assigns a new asset to an existing event or de-assigns an asset to an event. In an embodiment that correlates events from different dispatch systems, calculation of the number of assets may also include aggregating the number of assets assigned from different agencies or departments.

If the number of assets assigned to the event increases there is an escalation in the event. For example, the number of assets may increase if an event dispatcher (e.g., a 911 dispatcher) assigns more assets to the event which would result in an escalation of severity. If the number of assets has increased, flow then branches INCREASE to operation 406 and the event notification component sends an event escalation indication. The event escalation indication increases the localized severity level associated with the event. In other embodiments, an event escalation indication may not be sent until the increase in the number of assets reaches a specific threshold, predetermined range, or ordered by the incident commander. For example, escalation indications may not be sent until enough assets have been assigned so as to increase the severity level of the event. In alternate embodiments, the localized severity level of the event may not increase until a predetermined number of event escalation indications are sent by the event notification components. Flow then returns to operation 402.

Referring back to operation 404, if the number of assets decreases, flow branches DECREASE to operation 408. For example, the number of assets may decrease if a dispatcher removes assets from an event or if an asset completes its assignment with regard to the event. At operation 408, the event notification component sends an event de-escalation indication. In embodiments, the event de-escalation indication decreases the localized severity level associated with the event. Alternatively, an event de-escalation indication may not be sent until the decrease in the number of assets reaches a specific threshold or brings the event to a lower severity level. In other embodiments, the localized severity level of the event may not decrease until a predetermined number of event de-escalation indications are sent by the event notification component.

Flow proceeds from operation 408 to operation 410 where a determination is made as to whether the event is still in progress. In an embodiment, the event notification component determines if there are any remaining assets assigned to the event after each change in number of assets. If there are remaining assets, the event is still in progress and flow branches YES and returns to operation 402. If there are no additional assets assigned to the event, then the event may be deemed completed, and flow branches NO to operation 412. In operation 412, an end call notification is sent to the notification provider indicating that the event has terminated and can be removed from navigation applications. In another embodiment, the determination of whether an event is still in progress is based upon a progress indication received from an event recording client or an event datastore. In such embodiments, the recording client or the datastore may periodically send an indication that an event remains in progress. The recording client or datastore may also send and end event indication. If an end event indication is received, operation branches NO to operation 412.

Regardless of the method used, if the system determines that the event is still in progress flow branches YES and returns to operation 402 in which it monitors for new information While the embodiments described with respect to FIG. 4 define severity level escalation and de-escalation with respect to the number of assets present at the incident and/or responding to the incident, escalation, de-escalation, and termination of the event may be accomplished by receiving other types of information. For example, an incident commander may send specific messages to the system which cause instruct the system to escalate the severity level, de-escalate the severity level, or even terminate the incident. One of skill in the art will recognize that other methods of escalation, de-escalation, and termination of events may be practiced with the systems and methods disclosed herein.

Figure 5:
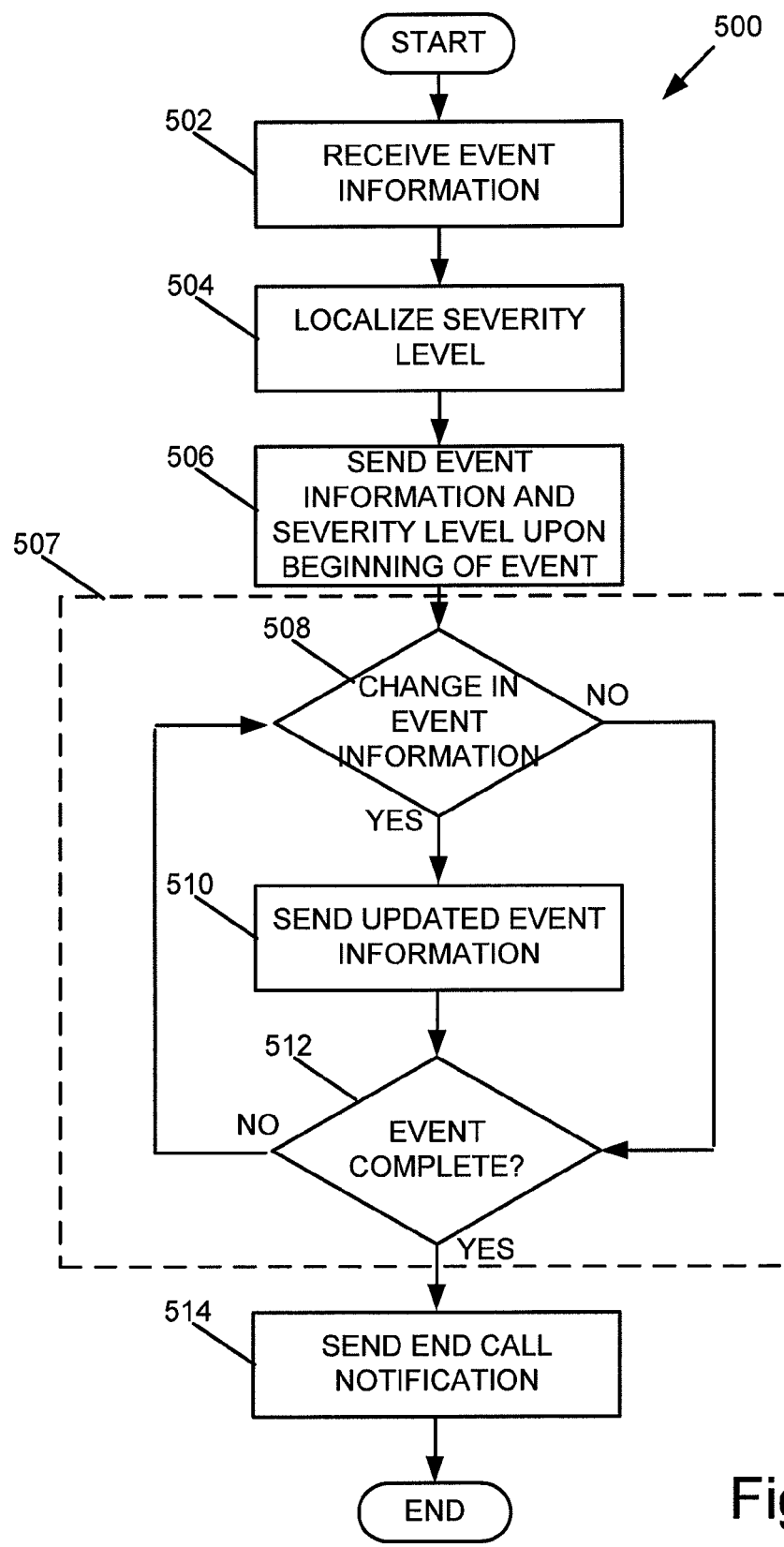
FIG. 5 is a flow chart representing an embodiment of a method for providing non-emergency event information.

FIG. 5 is a flow chart representing an embodiment of a method 500 for providing non-emergency (e.g., previously scheduled) event information. Flow begins at operation 502 where the event notification component, such as event notification component 106 (FIG. 1) receives information about a non-emergency event from an event datastore, such as event datastore 104 (FIG. 1). In an embodiment, the non-emergency event information may be received from an event datastore associated with a public works datastore, as described with respect to FIG. 1. Alternatively, information may be directly entered into the event notification component by personnel associated with or regulating the event. Non-emergency event information may include additional information not present in other event datastores. For example, non-emergency events may be related to scheduled events such as races, parades, and/or scheduled construction. Such events include information such as a start time and an end time for the event. Additionally, non-emergency events may not be confined to a particular area but a route, as is the case with a parade or a race. For example, specific streets to blocked off and the period during which they are scheduled to blocked off may be included. Thus, the event location information may include an entire route rather than just latitude and longitude coordinates, an address, or an intersection.

After receiving the event information, flow proceeds to operation 504 where the event severity level is processed. In embodiments, the processing at operation 504 may be similar to the processing operations described with respect to FIGS. 3 and 4. In other embodiments, the severity level may be calculated according to characteristics of the non-emergency event, such as but not limited to, a full closure of the road, partial closure of the road, no road closure, etc. In further embodiments, operation 504 may include a translation operation (similar to the translation operation described with respect to operation 304) in order to translate event information received at operation 502 into a form that is compatible with the navigation component and/or navigation provider.

Flow proceeds to operation 504 where the event notification component sends the processed event information to the notification component upon the start of an event. For example, in one embodiment where the event has a determined start time, such as a parade or race, the event notification component sends the event information upon reaching the specific start time.

Flow then proceeds to a monitoring and updating operation 507. The monitoring and updating operation 507 begins with operation 508 where the event notification component determines if there is a change in the event information, that is, based on the current time has there been a change in conditions relative to the last event information transmitted to the navigation application. Alternatively, this may occur in response to the event notification component receiving an update to event information. In yet another embodiment, the non-emergency event may be combined with any associated "emergency" events such as dispatched assets or events in other event datastores and changes in those events may be associated with the non-emergency event. There are many different options available for determining if a change has occurred based on the information available to the different components of the system, and any method or criteria that meet the needs of the operator may be used herein.

If the event notification component determines that there is not an update to event information, flow branches NO to operation 512. However, if there is a change in event information, flow branches YES to operation 510 and the event notification component sends the updated event information to the notification component. For example, if the current time indicates, based on the scheduled event information, that a parade should now be approaching or leaving a particular intersection (or that a road should be closed in anticipation of the parades progress), data will be transmitted to the navigation application so that the navigation application is aware of the presumed current conditions and those conditions can be transmitted to the personal navigation devices. In one embodiment, this information may be tracked by having a detailed schedule of the parade stored and available to the event notification component. In another embodiment, vehicles participating in or assigned to the parade may be equipped with a device like the AVL that transmits the real-time location of the vehicle. For example, if the last vehicle in the parade is equipped with an AVL, the event notification component can track the tail end of the parade and determine which areas of the parade route are completed and thus open to traffic. After sending the updated notification flow then proceeds to operation 512.

At operation 512, the event notification component determines if the event has concluded. For example, in the case of parade or race, the event component determines if the end time of the event has been reached. In another embodiment, assets may be assigned to the non-emergency event. In such an embodiment, the determination at 512 may be similar to the determination of the termination of the event as described in FIGS. 3 and 4. In yet another embodiment, the event notification component may receive an indication that the event has terminated from the event data store. If the event has not ended, flow returns to operation 508 and the event coordinator again checks for a change in event information. If the event has ended, flow branches YES to operation 514 and the event notification component sends and end call notification to the personal navigation device signaling the end of the event.

While the embodiments of the methods described in FIGS. 3-5 have been described as being performed by an event notification component, one of skill in the art will appreciate that the components of the systems described in FIGS. 1-2 may be combined without departing from the scope of the present disclosure. Thus, in alternate embodiments, the methods described in FIGS. 3-5 may be performed by other components disclosed herein, such as but not limited to, the navigation provider. In other embodiments, the methods disclosed herein may be practiced by software installed on general computing devices.

Furthermore, the methods presented in FIGS. 3-5 should be considered specific embodiments of general methods for delivering real time event information to a personal navigation device. As such, the disclosed embodiments should not be considered limiting the scope of this disclosure or the system as a whole. The reader will understand that numerous alternative embodiments are possible in which the various operations described may be reordered or performed in parallel to achieve the same result. For example, in an alternative embodiment of FIG. 5 the send updated event information operation 510 may not be performed until after the event complete determination operation 512 has been finished.

In the embodiments described above, the information received from the datastore and/or transmitted to the navigation applications could be intentionally limited or modified in order to prevent the unwanted disclosure of sensitive information. For example, in some cases, such as for instance shootings or arrests, it may not be desirable that the nature of the event be displayed to end users. The embodiments described herein could be adapted so that only a notification that a severe event affecting traffic is occurring at that location. Similarly, in cases in which there is a desire that the location of an asset assigned to an event be kept secret, the asset may be given a specific type code preventing it from being displayed to end users in a way that would allow it to be identified. For example, in such a situation the location of the asset may not be transmitted to the navigation application or may be assigned a generic traffic disruption type identifier. Other ways of providing limited information are also possible. In still further embodiments, the systems and methods disclosed herein may be modified such that no emergency vehicles or events are disclosed to the public. An indicator or flag may be set to stop transmitting emergency information. In such embodiments, the indicator or flag may be changed, thus allowing the systems and methods to toggle between displaying or not displaying emergency information.

Figure 6:
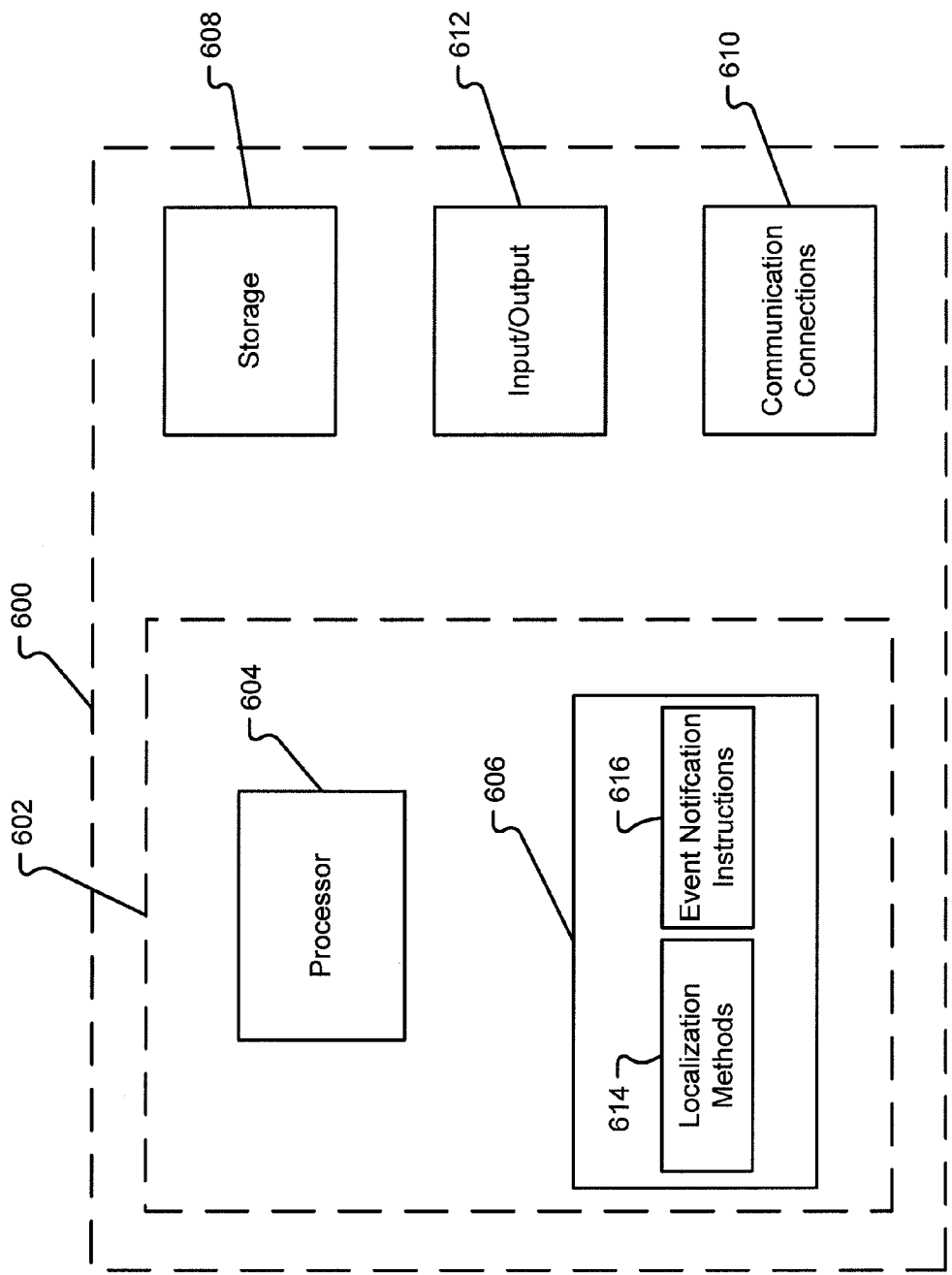
FIG. 6 is a functional diagram illustrating a computer environment and computer system operable to execute embodiments of the present disclosure.

The disclosed systems and methods may be performed using logic implemented in hardware or in software executed by hardware. With reference to FIG. 6, an embodiment of a computing environment for implementing the various embodiments described herein includes a computer system, such as computer system 600. Any and all components of the described embodiments may execute as or on a client computer system, a server computer system, a combination of client and server computer systems, a handheld device, and other possible computing environments or systems described herein. As such, a basic computer system applicable to all these environments is described hereinafter.

In a very basic configuration, computer system 600 comprises at least one processing unit or processor 604 and system memory 606. The most basic configuration of the computer system 600 is illustrated in FIG. 6 by dashed line 602. In some embodiments, one or more components of the described system are loaded into system memory 606 and executed by the processing unit 604 from system memory 606. Depending on the exact configuration and type of computer system 600, system memory 606 may be volatile (such as RAM), non-volatile (such as ROM, flash memory, etc.), or some combination of the two.

Additionally, computer system 600 may also have additional features/functionality. For example, computer system 600 includes additional storage media 608, such as removable and/or non-removable storage, including, but not limited to, magnetic or optical disks or tape or any other type of non-transitory storage media. In some embodiments, software or executable code and any data used for the described system may be permanently stored in storage media 608. Storage media 608 includes volatile and non-volatile, removable and non-removable media implemented in any method or technology for storage of information such as computer readable instructions, data structures, program modules, or other data. In embodiments, the capability negotiation methods and wrapper inner methods are stored in storage media 608.

System memory 606 and storage media 608 are examples of computer storage media. Computer storage media includes, but is not limited to, RAM, ROM, EEPROM, flash memory or other memory technology, CD-ROM, digital versatile disks ("DVD") or other optical storage, magnetic cassettes, magnetic tape, magnetic disk storage, other magnetic storage devices, or any other medium which is used to store the desired information and which is accessed by computer system 600 and processor 604. Any such computer storage media may be part of computer system 600. In some embodiments, mammogram images and/or results of probability determination are stored in system memory 606. In embodiments, system memory 606 and/or storage media 608 stores data used to perform the methods or form the system(s) disclosed herein, such as receiving and updating event information, localization of severity levels, etc. In embodiments, system memory 606 would store information such as severity localization methods 614 and event notification instructions 616 for performing the methods described herein. In embodiments, localization methods 614 may be used to perform severity localization by an event notification component or a navigation provider component. Event notification instructions 616, in embodiments, store the instructions necessary to perform the methods described with respect to FIGS. 2-4.

Computer system 600 may also contain communications connection(s) 610 that allow the device to communicate with other devices. In embodiments, communications connection(s) 610 may be used to transmit and receive messages between sender devices, intermediary devices, and recipient devices. Communication connection(s) 610 is an example of communication media. Communication media may embody a modulated data signal, such as a carrier wave or other transport mechanism and includes any information delivery media, which may embody computer readable instructions, data structures, program modules, or other data in a modulated data signal. The term "modulated data signal" means a signal that has one or more of its characteristics set or changed in such a manner as to encode information or a message in the data signal. By way of example, and not limitation, communication media includes wired media such as a wired network or direct-wired connection, and wireless media such as an acoustic, RF, infrared, and other wireless media. In an embodiment, webpages may be transmitted over the communication connection(s) 610.

In some embodiments, computer system 600 also includes input and output connections 612, and interfaces and peripheral devices, such as a graphical user interface. Input device(s) are also referred to as user interface selection devices and include, but are not limited to, a keyboard, a mouse, a pen, a voice input device, a touch input device, etc. Output device(s) are also referred to as displays and include, but are not limited to, cathode ray tube displays, plasma screen displays, liquid crystal screen displays, speakers, printers, etc. These devices, either individually or in combination, connected to input and output connections 612 are used to display the information as described herein. All these devices are well known in the art and need not be discussed at length here.

In some embodiments, the component described herein comprise such modules or instructions executable by computer system 600 that may be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some embodiments, computer system 600 is part of a network that stores data in remote storage media for use by the computer system 600.

In yet another embodiment, the systems and methods disclosed herein may be used to gather disaster related information from a disaster management organization or agency, such as but not limited to, the an Emergency Operation Center ("EOC") managing a disaster and/or the Federal Emergency Management Agency ("FEMA") and distribute the disaster related information to the public via computers, GPS, and/or personal navigation devices, such as devices 120 (FIG. 1). In embodiments, the information may be gathered from a disaster management agency by connecting an event notification component 106 (FIG. 1) to event recording clients 102 (FIG. 1) and/or event datastores 104 (FIG. 1) directly, over a network, or via a Virtual Private Network ("VPN") in a manner as described in FIG. 1. During disaster events, such as floods, hurricanes, tornadoes, tsunamis, mass casualty events, terrorist attacks, wildfires, etc. disaster related information is transmitted from the event notification component 102 to a navigation provider 116 as described in FIG. 1.

Figure 7:
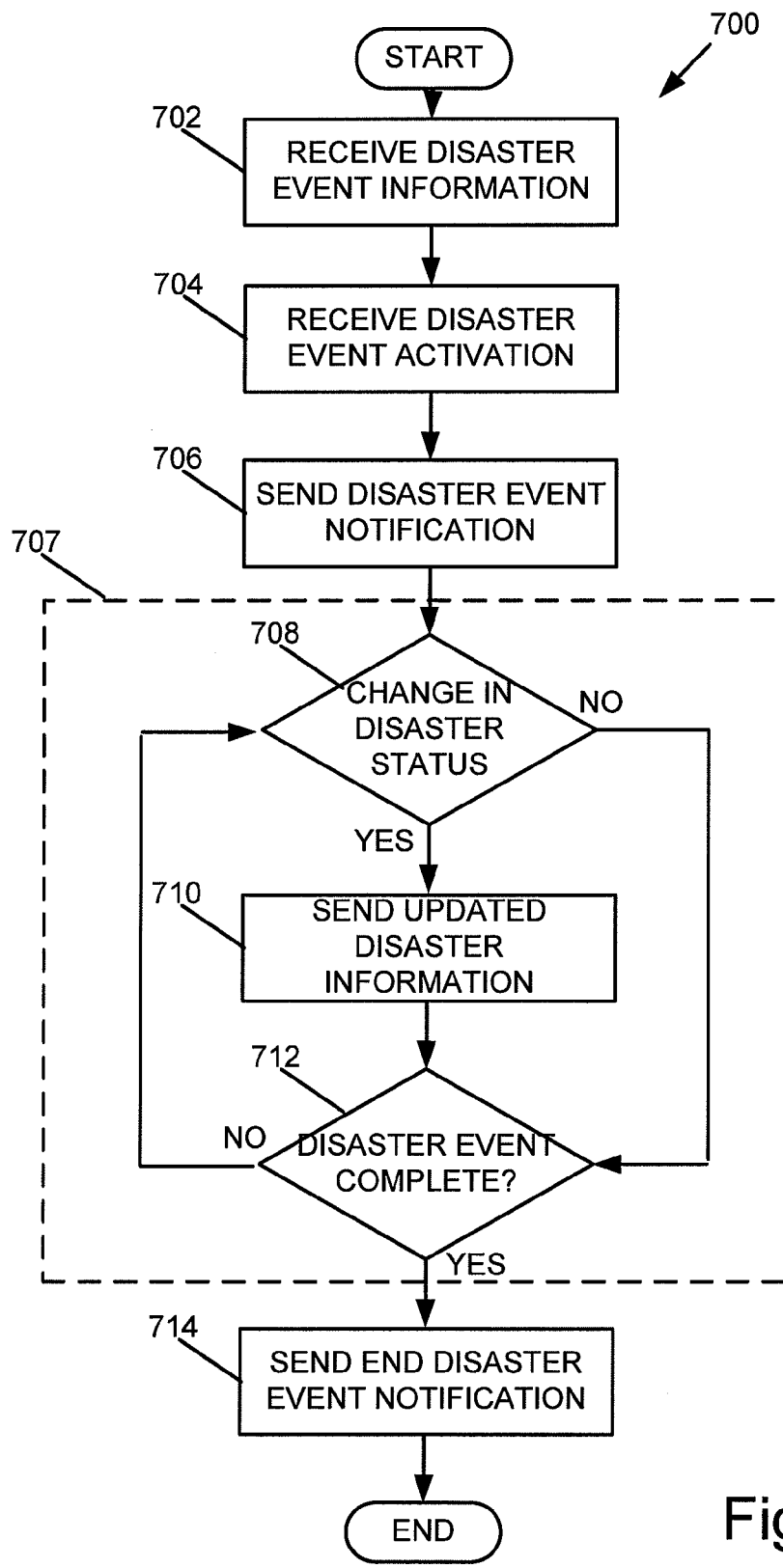
FIG. 7 is a flow chart representing an embodiment of a method for providing disaster event information.

FIG. 7 is a flow chart representing an embodiment of a method 700 for providing disaster event information. Flow begins at operation 702 where the event notification component, such as event notification component 106 (FIG. 1) receives information about a disaster event. In one embodiment, the disaster event information received at operation 702 comprises static preplanned disaster event information. For example, preplanned disaster information may comprise information regarding shelters, hospitals, primary and secondary evacuation routes, disaster recovery centers, points of distribution (areas capable of providing services for a large group of people such as, for example, stadiums, arenas, amusement parks, etc.), economic recovery locations, etc. The location of these disaster facilities may be identified using a physical address (e.g., a mailing address) or by the latitude/longitude location corresponding to the facility. Furthermore, disaster information may contain additional information related to the disaster facilities and/or evacuation routes. For example, the disaster information identifying a particular facility may include a field of data providing a description of facility, the services provided by the facility, whether or not the facility is at capacity or any other type of information relevant to the facility. Similarly, additional data may be transmitted with respect to evacuation routes such as information related to traffic flow, whether the route is open or not, accident information or any other information related to the evacuation routes.

While the disaster information received at operation 702 is described at being static, preplanned information, it is not necessary that the information is static. In other embodiments, the information received at operation 702 may be dynamic. For example, the location of the disaster facilities may be changed, the individual facilities may be activated or deactivated by an incident commander, new facilities may be added, etc. One of skill in the art will appreciate that such disaster information may change anytime before, during, or after a disaster event. As will be described in further detail below, as disaster event information changes the methods disclosed herein provide for sending updated information to interested parties.

Flow proceeds to operation 704 where the event notification component, such as event notification component 106 (FIG. 1) receives a disaster event activation notification. The disaster event activation notification informs the event component that a disaster event is currently occurring or expected to occur and activates the disaster event notification systems and methods disclosed herein. In embodiments, the disaster event activation notification may be represented by a unique event ID. In such embodiments, all information related to assets such as shelters, hospitals, primary and secondary evacuation routes, disaster recovery centers, points of distribution, and/or economic recovery locations may be associated by the particular disaster by including or referencing the unique event ID associated with the disaster. By creating this association between assets, information, and the disaster, a determination can be made as to which information and assets must be sent and/or displayed to users or emergency responders. In another embodiment, all assets and or information may be associated with a disaster based upon the location of the disaster. For example, static information already stored on the system, such as, for example the location of shelters, may not have a field associated with the information with the event ID of the particular disaster. In such instances, information and assets may be assigned to the disaster based upon the proximity of the facility or asset to the disaster.

Upon activating the system, flow proceeds to operation 706 where the event notification component sends critical information related to the disaster to responders and the public. In one embodiment, the disaster event information may be relayed to responders and the public via a network, such as the Internet, a satellite or terrestrial broadcasting network, a cellphone network a landline telephone network, or any other type of network. In another embodiment, the disaster event information may be sent to a navigation provider, such as navigation provider 116 (FIG. 1). In one embodiment, the information sent by the event notification component may include information about the disaster, such as type of disaster, expected duration of the disaster, intensity of the disaster, etc. One of skill in the art will appreciate that the information about the disaster may be specific to the type of disaster and may vary based on the type of disaster. In another embodiment, all of or a subset of the disaster event information received by the event notification component at operation 702 or at a later time is sent to the navigation provider. The navigation provider, in turn, sends the disaster information to users who can access the information via GPS services and/or personal navigation devices.

In some circumstances, it may beneficial to send only a subset of information to the navigation provider at operation 706. For example, if the disaster event activation notification received at operation 704 indicates that a disaster is anticipated but has not yet happened, information related to evacuation routes and shelters may be transmitted to the navigation provider at operation 706. Because the disaster has not yet happened, there is no need to transmit information related to disaster recovery centers and points of distribution. Doing so would cause unnecessary data to be transmitted over the networks connecting the event notification component, navigation provider, and personal navigation devices. Furthermore, the additional information would clutter the user display of the personal navigation device with unnecessary information making it more difficult for the user to quickly determine the best evacuation route to take or which shelter travel to. Conversely, if the disaster event activation notification received at operation 704 indicates that a disaster has already happened information related to disaster recovery centers, points of distribution, etc. may be sent in operation 706.

After sending the disaster information at operation 706, flow proceeds to a monitoring and updating operation 707. The monitoring and updating operation 707 begins with operation 508 where the event notification component determines if there is a change in the disaster status. For example, a change in the disaster status may be indicated by receiving additional disaster event application notifications. As an example, different types of disaster event activation notifications may be sent corresponding to the beginning, duration, or termination of a disaster. One of skill in the art will appreciate that these types of disaster activation event notifications are provided as examples only and many different types of disaster notification activation event notifications are contemplated within the scope of the disclosure. In another embodiment, a change in disaster status may be indicated by receiving additional information related to the disaster. For example, during a disaster event circumstances may change that result in the changing of shelter locations, evacuation routes, etc. These changes may occur due to the circumstances of the disaster or may be made based off of decisions of an incident commander or the disaster agency monitoring the disaster.

If the event notification component determines that there is not a change in the disaster status, flow branches NO to operation 712. If the event notification component determines that there is a change in the disaster status, flow branches YES to operation 710. At operation 710 updated disaster information received by the event notification component, such as but not limited to a change in the disaster status, changes related to evacuation routes, shelters, disaster recovery centers, points of distribution, etc. are sent to the navigation provider or other service providers. As previously described, the type of information sent may change depending upon the status of a disaster (e.g., evacuation routes sent during the disaster, points of distribution sent after the disaster). In embodiments, information related to economic recovery locations may be added that are helpful in disaster situations, such as gas stations, restaurants, building material stores, restaurants, etc. may be provided at operation 710. In such embodiments, economic recovery locations are only provided upon confirming that the individual businesses are actually operational. For example, such information may only be sent if the individual businesses contact the disaster management organization such as an EOC or FEMA and report that they are operational and staffed. Operations 708 and 710 facilitate the changing and updating of such information during the course of a disaster. Upon sending the updated disaster information, flow proceeds to operation 712.

Upon reaching operation 712, the event notification component determines if the disaster event is complete. In one embodiment, completion of the disaster event may be indicated by the receipt of a specific message notifying the event component of the completion of the disaster event. In other embodiments, the completion of the disaster may be determined as described with respect to the completion of the emergency and non-emergency events previously described with respect to FIGS. 3-5. If the disaster event is not complete, flow branches NO to operation 708 and the event notification component again determines if there has been a change in the disaster status. If the disaster has ended, flow branches YES to operation 714 and the event notification sends and end disaster notification to the navigation component or other service providers signaling the end of the disaster.

As described above, the disclosed method provides the ability to provide real-time updates to emergency responders and/or the public by continually monitoring and updating changes during a disaster event. The systems and methods disclosed herein may be used to improve communications to the public who have access to a navigation device, a general computing device, or another navigation program, such as, but not limited to, Bing Maps, Google Maps, or any other information service cooperating with the systems and methods disclosed herein.

The following is a more detailed example of the data flow in FIG. 7 to illustrate how the real-time transmission of data may be implemented. When an agency such as FEMA declares a disaster (e.g., a hurricane, tornado, flood warning, a snowstorm, etc.), a dispatch or other central communications center (e.g., component 102 of FIG. 1) will be activated that will be in contact with an event notification system (e.g., component 106 of FIG. 1). The event notification system will assign an event ID to the disaster. From that point on until the disaster is declared to be over, the systems described herein can be used to automatically transmit various disaster-related information in real-time to the public and various emergency responders. In an embodiment, the initial declaration of a disaster may include the designation of a geographic area (Elbert County, for example). In response, the event notification system could transmit this information to the navigation provider 116 so that any maps being displayed that include Elbert County may also display a text message describing the disaster. Such notification would be beneficial in addressing the deaf and hearing impaired's needs as the system can send an alert and display a text with initial information depending on the type of event. Furthermore, the disaster event notification system may be used in conjunction with the other event notification systems disclosed herein to provide a complete event notification system. For example, by working with the other systems disclosed here, if the device is close proximity to a disaster or an asset such as a responding emergency vehicle, the device through the alert could be directed to vibrate, sound an audio alarm (e.g., announce, "warning emergency vehicle approaching" or "you are entering a disaster area" or any other type of audible warning) while displaying the same. One of skill in the art will appreciate that the disaster event methods and systems herein can interoperate with the other event notification systems disclosed herein to provide navigation providers (e.g., NAVTEQ, GARMIN, Google Maps, etc.) and ultimately to end users in order to provide a comprehensive event notification system.

After the disaster is declared, FEMA may then identify a number of locations, possibly of different types (shelters, food distribution centers, incident command centers, equipment staging locations, etc.), to be broadcasted to the public or to specific responders. In an embodiment, this could be done through an electronic dispatch system operated by FEMA that includes the entry of a location, type of asset (e.g., an emergency vehicle, a facility, etc.), and, perhaps, other information such as textual information. The event notification component takes or receives this information from the dispatch system. From the information obtained, each location is assigned an asset ID and a data string is created for transmission to the navigation provider 116. In an embodiment, each string may identify the disaster, the asset, the asset's location and any other information deemed necessary. As discussed above, for each new asset or change in an asset's status, a data string may be generated and sent to the navigation provider 116. Because a new string is transmitted after each status change, the information sent from the navigation provider 116 is updated in real-time to reflect the most current information in the FEMA dispatch database.

While the embodiments described in FIG. 7 have been described as being performed by an event notification component, one of skill in the art will appreciate that the components of the systems described in FIGS. 1-2 may be combined without departing from the scope of the present disclosure. Thus, in alternate embodiments, the methods described in FIG. 7 may be performed by other components disclosed herein, such as but not limited to, the navigation provider. In other embodiments, the methods disclosed herein may be practiced by software installed on general computing devices, such as the computer environment and computer system disclosed in FIG. 6. Furthermore, one of skill in the art will appreciate that the method disclosed in FIG. 7 may be practiced using a tiered service model, for example by providing some information to the public via a system such as the system disclosed in FIG. 1 and providing additional or different information to emergency responder units via a system such as the system disclosed in FIG. 2. In such tiered service systems, the amount and type of information sent to the public and the emergency responders may differ as previously described.

Figure 8:
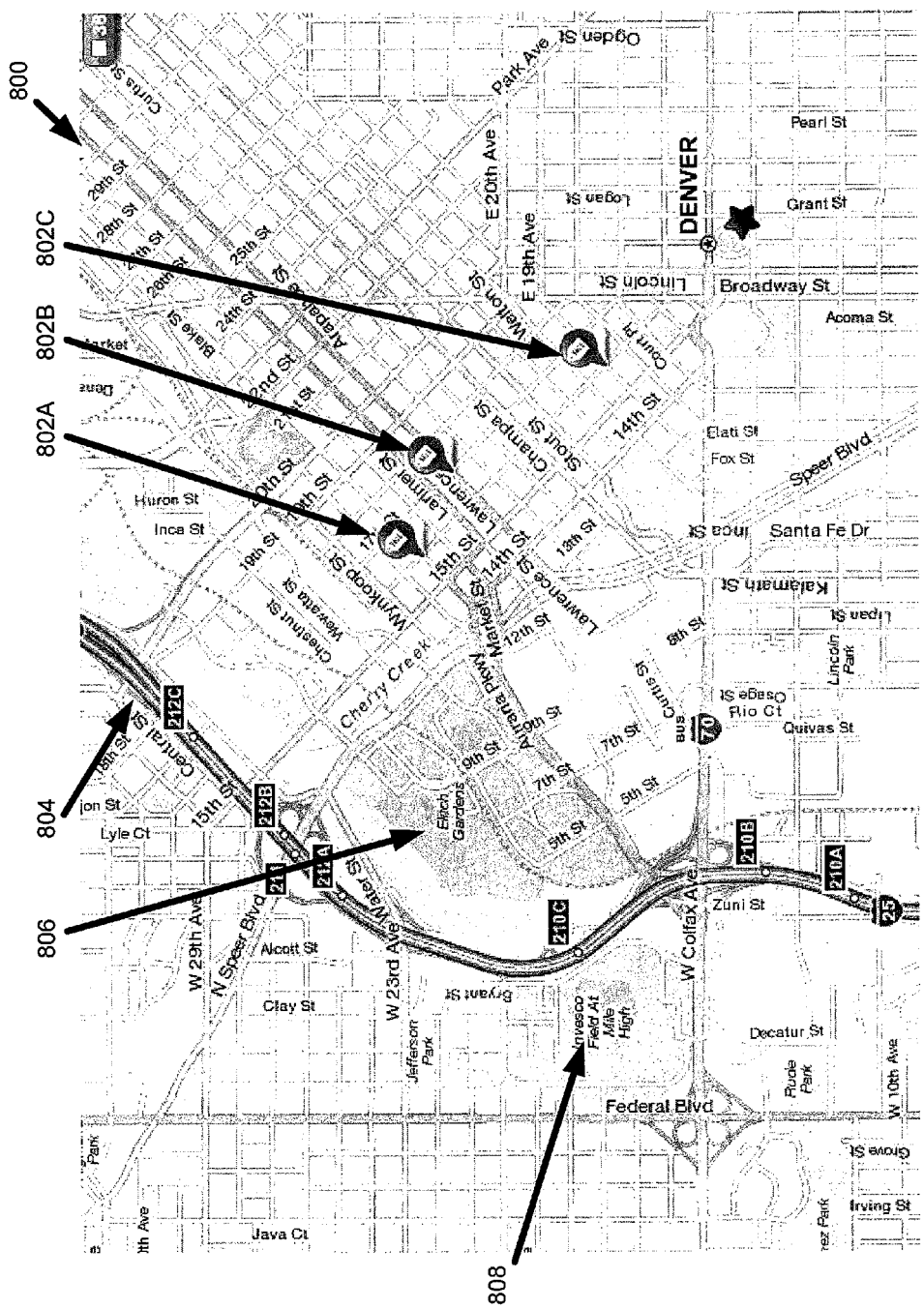
FIG. 8 is an illustration of an embodiment of a user interface that displays information to users during a disaster event.

FIG. 8 is an illustration of an embodiment of a user interface 800 that displays information to users during a disaster event. As displayed in FIG. 8, in embodiments a map of the disaster area is displayed to the user with different indicators overlaid on the map to display disaster information, such as shelter locations, evacuation routes, points of distribution, disaster recovery centers, etc. For example, icons 802A-C indicate the location of available shelters that the user may travel to. Evacuation routes may be highlighted on the map such as the highlighted route 804. Other areas such as points of distribution 806 and disaster recovery centers 808 may also be highlighted on the map displayed to the user. Although not displayed in FIG. 8, in further embodiments, the user interface may provide additional information about the various disaster related areas. In one embodiment, the information may be displayed to the user in a graphical pane other than the map displayed in FIG. 8. In another embodiment, the information may be displayed to the user upon the user selection of the disaster related area by, for example, highlighting the area using a mouse, keyboard, or touch screen. One of skill in the art appreciate that the user interface 800 provided in FIG. 8 is merely an example user interface that can be practiced with the systems and methods disclosed herein. Any other type of user interface capable of highlighting disaster areas and/or any of the other indicators disclosed herein are contemplated within the scope of this disclosure.

In additional embodiments, the user interface may be enhanced to provide auditory alerts to the user in case of a disaster or other event. An auditory alert may be a warning sound or may be a verbalized announcement. The auditory warning may be used in conjunction with the embodiment of the graphical user interface provided in FIG. 8. A user interface may further provide tactile alerts such as vibrating to alert users of events, updates to information, and/or changes of status.

Figure 9:
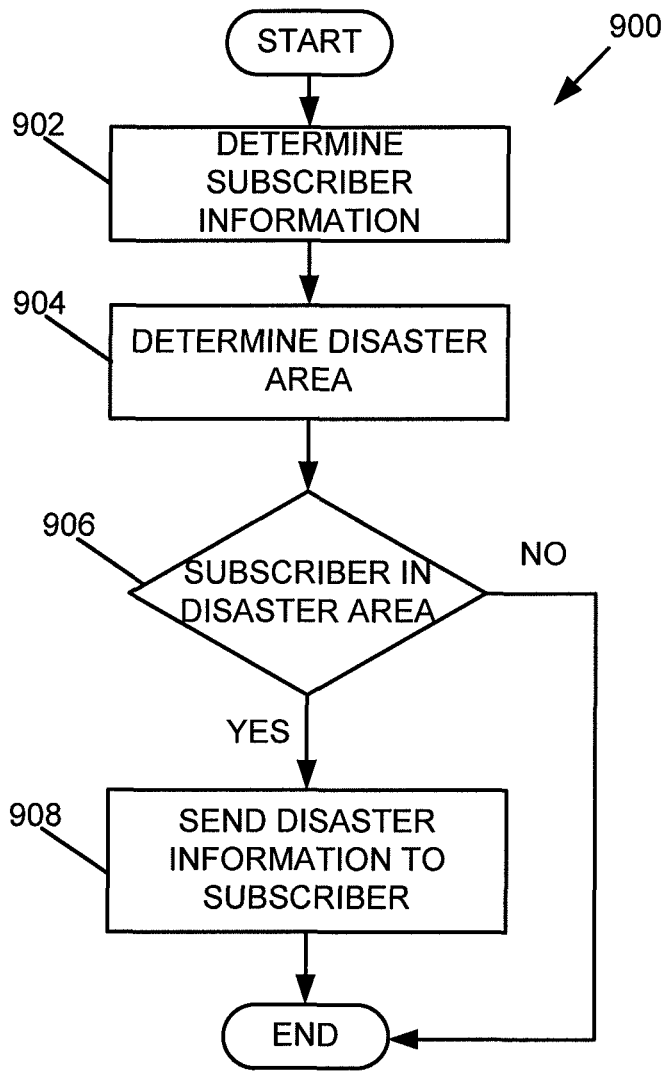
FIG. 9 illustrates a flow chart representing an embodiment of a method 900 for providing disaster event information to a navigation application or device.

Referring now to FIG. 9, FIG. 9 illustrates a flow chart representing an embodiment of a method 900 for providing disaster event information to a navigation application or device, such as, for example, a personal navigation device (120). In embodiments, method 1000 may be performed by an event notification system with an event notification component, such as system 100 (FIG. 1) and event notification component 106 (FIG. 1). The method 900 may be employed to determine which users to send the disaster event information to during a disaster. In embodiments, the method 900 may be performed by an event notification component to determine which users to provide disaster event information to during step 706 (FIG. 7). Flow begins at operation 902, where the method 900 determines subscriber information. In one embodiment, subscriber information may be stored in a subscriber list that is a part of an event notification system, such as system 100 (FIG. 1). In another embodiment, the subscriber information may be stored in a database that is a part of the event notification system. Subscriber information may relate to information about users and/or devices who have signed up to receive event notification such as disaster event notifications. In other embodiments, subscriber information may relate to all people within a disaster area, whether or not they have signed up to receive event notification.

In embodiments, subscriber information may include information related to the user, such as, but not limited to, the user's name, address, current location, notification preferences, or any other information related to the user. In another embodiment, subscriber information may contain information related to the user's device, such as, but not limited to, the type of the device, the location of the device, device capabilities, device settings, etc. In embodiments, subscriber information may be used to determine what type of information to send to the subscriber. For example, the subscriber may request specific types of notification or the subscriber's device may require that it receives information in a specific format.

Flow continues to operation 904, where the disaster area is determined. In one embodiment, the disaster area may be determined and calculated as a specific quadrant, geospace, area on a map delineated by a boundary, by specific latitude and longitude coordinates, by a range of latitude and longitude coordinates, by an area defined around a disaster event, by a city, state, or country, or by any other means of determining an area. In one embodiment, the disaster area is dynamically determined by an event notification system. In another embodiment, a disaster area may be determined by a person, an agency, or any other device. In such embodiments, the disaster area may be provided to the event notification component.

Upon determining the disaster area, flow continues to decision operation 906, where the method 900 determines if the subscriber is in the disaster area. For example, the location of the subscriber may be compared to the disaster area to see if the subscriber located within the disaster are or within a certain proximity of the disaster area. In embodiments, only subscribers located within the disaster area itself or within a certain proximity of the disaster are receive information related to the disaster. Only providing disaster information to such subscribers provides the benefit of reducing the amount of information transmitted over a network, which may be strained do to disaster conditions.

In embodiments, the subscriber's location may be determined by determining the location of the device. In such embodiments, device information may be determined by receiving real-time device location coordinates from the device itself. The real-time coordinates may be provided by an onboard GPS unit that is part of the device, by the location of the device as indicated by its proximity to a cell tower, by the device's IP address, or by any other means of determining real-time location information known. In such embodiments, the device may periodically transmit its location to the event notification system. The event notification system may save the device location information along with the subscriber information. In another embodiment, the subscriber's location may be statically stored by the subscriber. For example, a subscriber may provide his or her location information to the event notification system. For example, a subscriber may provide the event notification system with his or her home address, or travel locations and dates when the subscriber is travelling. This information may also be stored with the subscriber information gathered at operation 902.

If the subscriber is located in the disaster area flow branches YES to operation 908. At operation 908, disaster event notification is provided to the subscriber. For example, the information may be sent to the subscriber's device. For example, the type of disaster information discussed with respect to FIG. 7 is provided to the subscriber. In one embodiment, an event notification system practicing the method 900 may specifically send the information to the subscriber's device. For example, the information may be directly sent to the subscriber's device. In another embodiment, the event notification system practicing the method 900 may broadcast the disaster information in the disaster area rather than specifically addressing the information to subscribers. In such embodiments, the disaster information may be broadcast in such a manner that it is only available to subscribers of the event notification system.

If the subscriber is not in the disaster area or in proximity of the disaster area, flow branches NO from operation 908 and the method ends because there is no need to send disaster information to the user.

Figure 10:
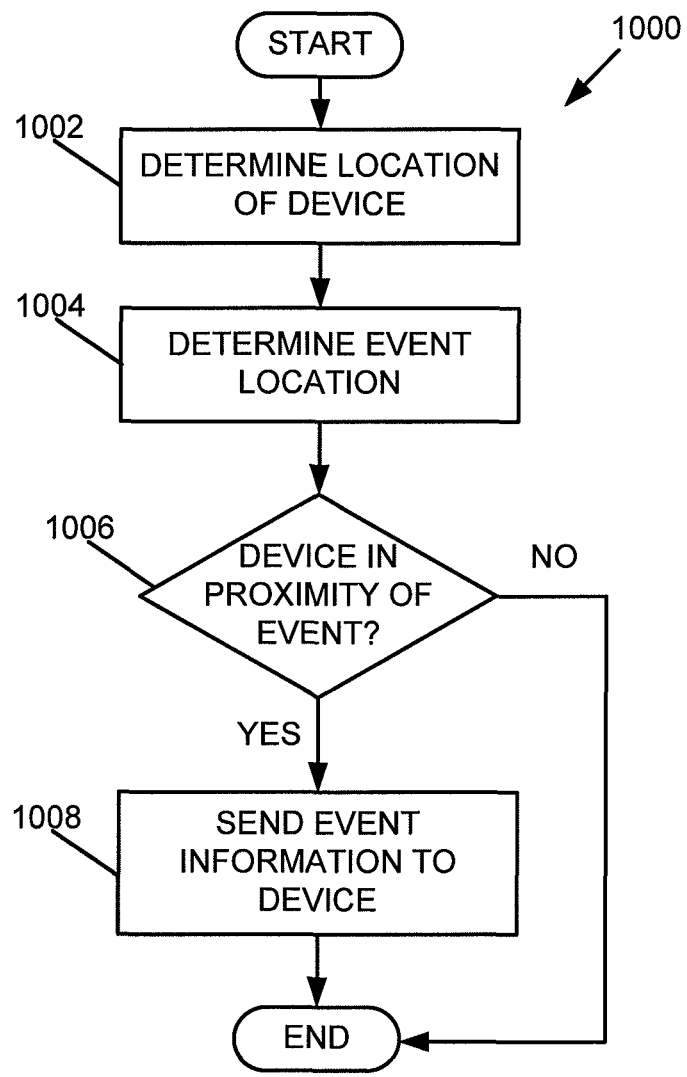
FIG. 10 is a flow chart representing an embodiment of a method 1000 for determining which whether or not event information is provided to a navigation application or device.

FIG. 10 is a flow chart representing an embodiment of a method 1000 for determining which whether or not event information is provided to a navigation application or device. In embodiments, method 1000 may be performed by an event notification system with an event notification component, such as system 100 (FIG. 1) and event notification component 106 (FIG. 1). In other embodiments, method 1000 may be performed by any type notification system, device, or even a general computing device as described with reference to FIG. 6. Flow begins at operation 1002, where the event notification system determines the location a device, such as a personal navigation device (120). In one embodiment, the event notification system may store the device location. In one such embodiment, the event notification system may periodically receive and store real-time device location. For example, the device location may be provided by a GPS component that is part of the device, by the device's IP address, by the location of a network connection point for the device, such as a cell phone tower connected to the device, by triangulation, or by any other means of determining a device location. In another such location, the event notification system may periodically poll the device for its location. In yet another embodiment, the event notification system may store static location information provided by a subscriber at an early time. In such embodiments, the event notification system may simply look up stored device information.

Upon determining the device location, flow proceeds to operation 1004. At operation 1004 the event notification system, determines a location of an event. In embodiments, an event may be an accident, a police car, fire truck, or ambulance responding to an event, a train, a municipal event, or any other type of event. In embodiments, the location of the event may be the location of the various types of assets and/or events previously described, for example, the events and assets described with respect to FIGS. 1 and 2. In circumstances where the event relates to a traveling event, such as, but not limited to asset 110 (FIG. 1) the event location may be provided by a GPS device located on the asset. In such embodiments, the asset may transmit its real-time location to the event notification system. The event notification system can use the real-time location to determine in other embodiments where the event is related to a non-moving event, such as a parade route, the event location may be statically stored in a datastore that is part of the event notification system.

Upon determining the event information, flow proceeds to decision operation 1006. At decision operation 1006, the event notification system determines if the device is within a related proximity of the event. In embodiments, the locations of the device and the events and/or assets are known to the event notification system. The event location system compares these locations to determine if the device is within a related proximity to the event. In embodiments, the determination of whether the device is in a related proximity to the event may vary depending on the type of event. For example, if the event is a static event such as a parade route, road closure, construction, etc., a related proximity may be a predefined area within range of the event. For example, any devices within a certain range of the event (e.g., 100 yards, 1 mile, 5 miles, etc.) may be defined as being in close proximity to the event. In still further embodiments, the device may display a map of a specific area. The notification component may receive information related to the area of the map displayed on the device. Any event within the map display may be defined as a related proximate event.

In other embodiments, the device's proximity to the event may be dynamically determined based upon the location and travel direction of the device and the location and travel direction of a mobile event (e.g., an asset as described with respect to FIGS. 1 and 2). In such embodiments, different proximity ranges may be determined by the event notification system. Depending on the proximity range, the event notification system may transmit different information to the device, as will be described in more detail with respect to operation 1008. Additionally, in embodiments, the proximity determination may depend on the direction of travel of the device and the moving event (e.g., asset). For example, if the device and event are moving away from each other a smaller proximity range may be defined because there is a smaller chance that the device and event will cross paths. Conversely, if the device and event are travelling towards each other, the related proximity range may be increased. The proximity range may be increased in order to provide the user with an earlier warning because the chance of the user and the moving event meeting is higher when the two are travelling towards each other.

Based upon the above discussion, one of skill in the art will understand that a proximity calculation can be statically defined or dynamically determined. Furthermore, any means of determining proximity values and/or any range of proximity may be employed with embodiments of the present disclosure.

If a determination is made that the device is not within proximity of the event, flow branches NO from operation 1006 and the method terminates. There is no need to provide the device with information about the event if the device is not in the area of the event. This allows the event notification system to conserve resources and bandwidth. However, if a determination is made that the device is within proximity of the event, flow branches YES to operation 1008.

Figure 12:
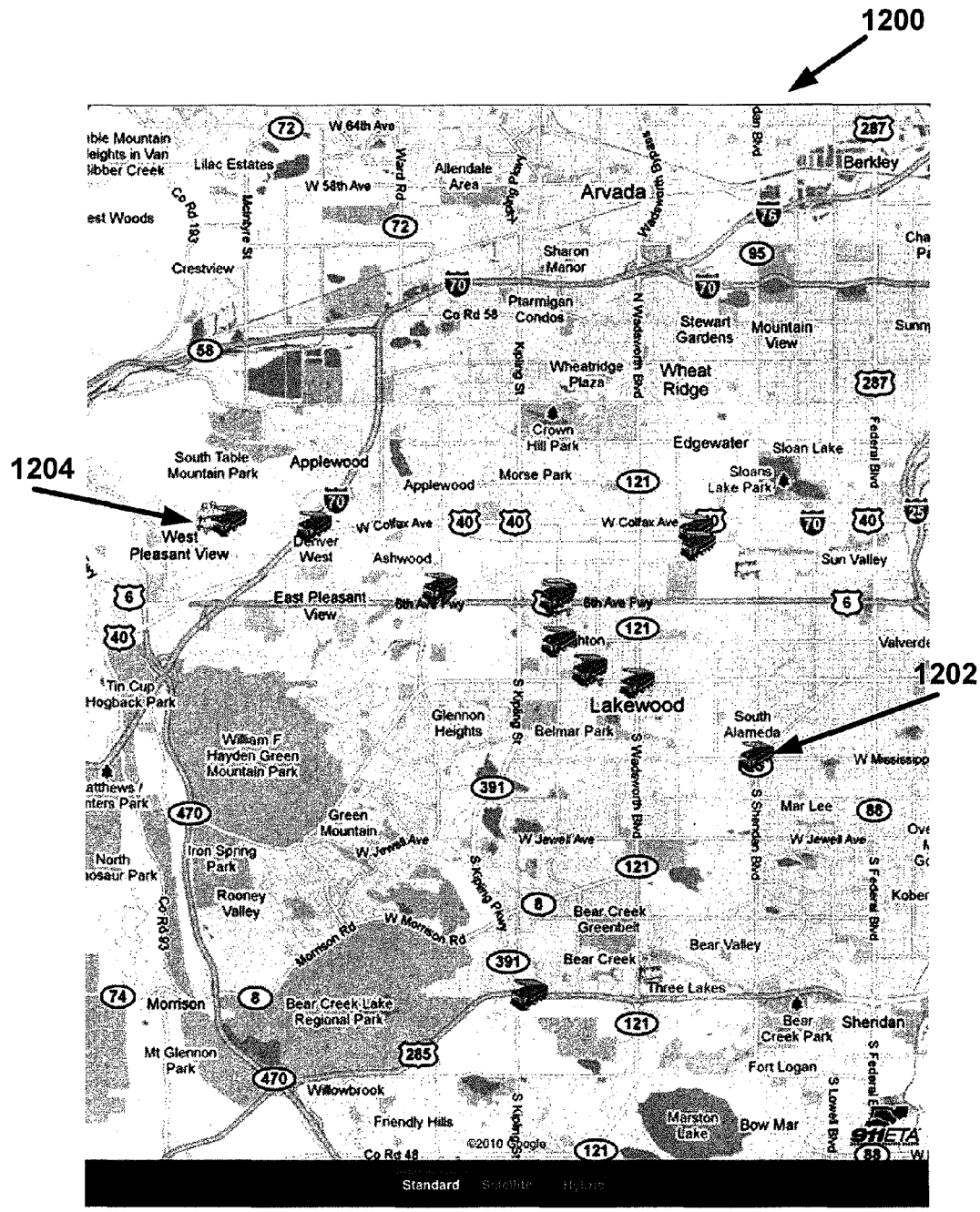
FIG. 12 is an embodiment of a user interface 1200 displaying a large map area.

At operation 1008, the event notification system sends event notification information to the device. The device may then be used to relay the information to a user, for example, through audio or visual display. In embodiments, event notification information contains information about events, assets, or both. The event notification information sent at operation 1008 may consist of any type of information related to the event and or asset. As previously described, the amount and or type of information sent at operation 1008 may depend upon the actual distance between the device and asset. For example, at further distances, the event notification system may transmit information to the device regarding the location and type of event and/or asset. FIG. 12 is an illustration of an embodiment of a user interface that shows events and assets over a large area. Because the device is not located within related proximity to the event, the event notification system, in embodiments, only transmits information related to the type of event and/or assets to the device. For example, as displayed in user interface 1200 the device received information about the location of fire trucks represented by fire truck icons, such as fire truck 1202, and construction represented by construction barricades, such as construction event 1204, located around the city. Because the device is not within a close proximity to these events and/or assets, the event notification system may only transmit information related to the location and type of event and/or asset at operation 1008.

In other embodiments, if the event notification system determines that the device is in a close proximity to the event, the event notification system may transmit additional information to the device. In such embodiments, the additional information may include the type of event and/or asset, the distance of the event from the device, information related to an audible and/or visual warning about the device and/or asset, the direction of travel of the event and/or asset, the speed of travel, instructions on how to handle the event (e.g., switching lanes if a police car is parked on the side of the road), and/or any other type of additional information related to the event. This additional information may be used by the device to provide an alert to the user.

Figure 13:
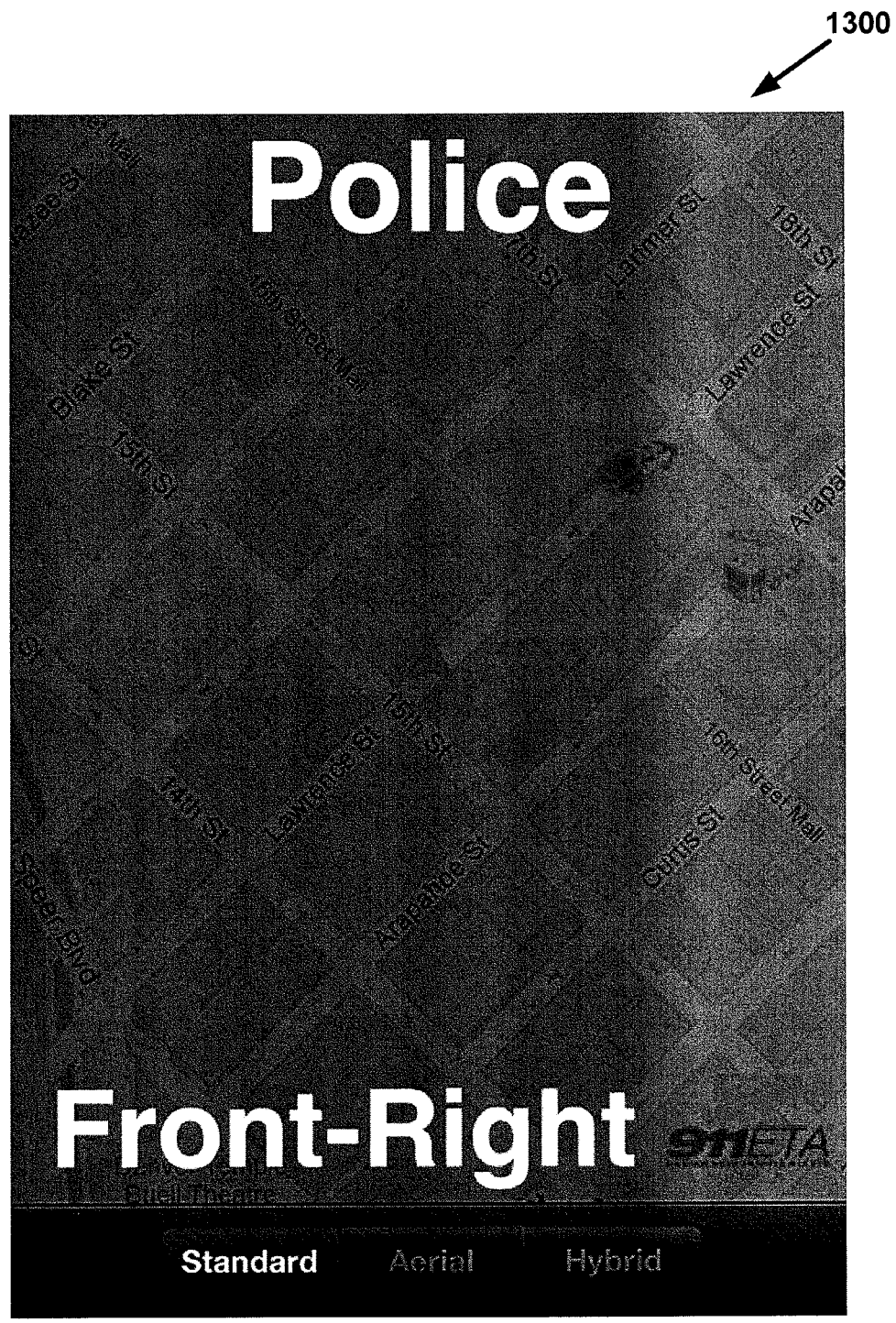
FIG. 13 is an example embodiment of a user interface 1300 displaying an alert to the user.
Figure 15:
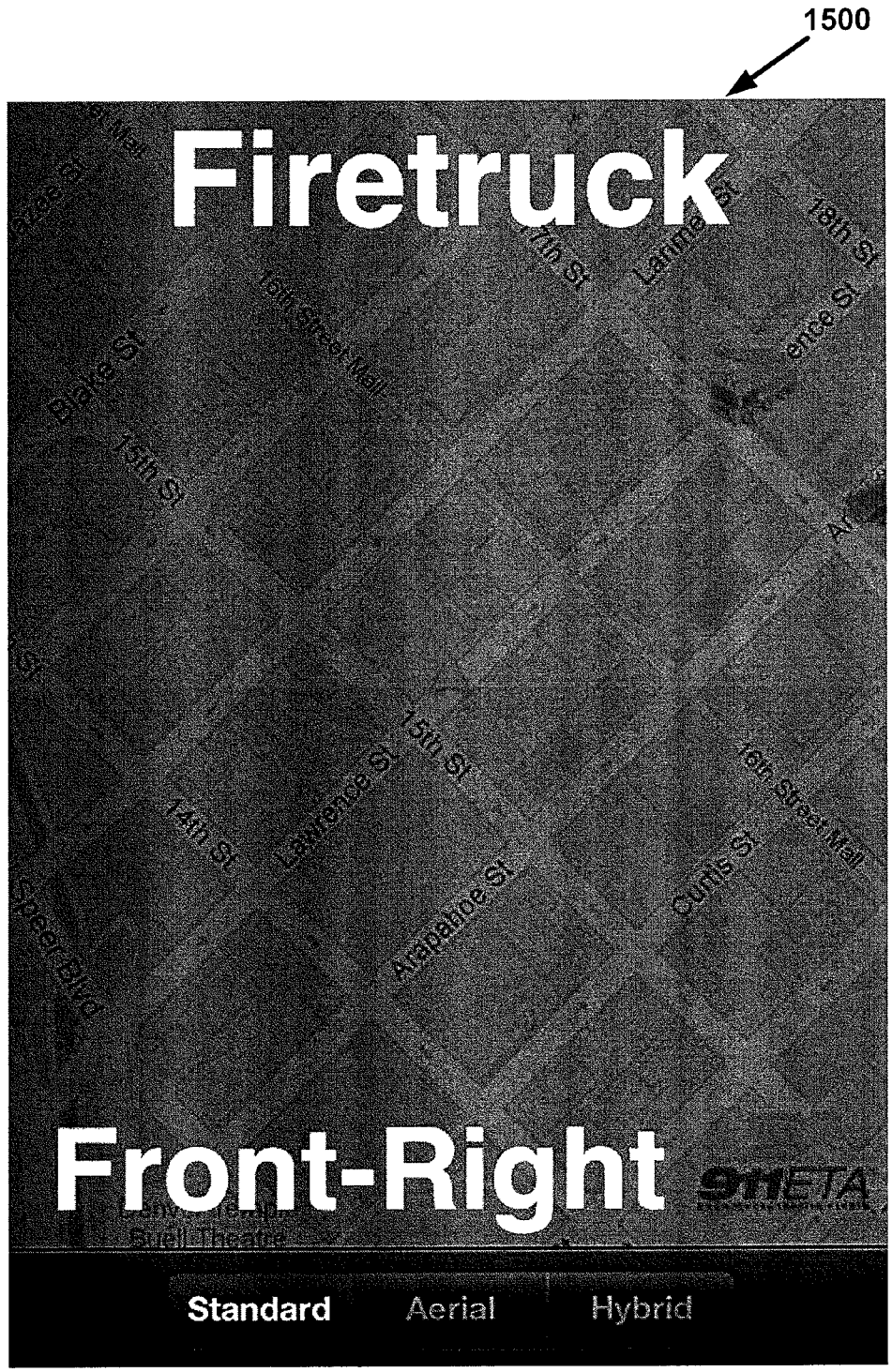
FIG. 15 is yet another embodiment of a user interface 1500 displaying an alert to a user.

For example, FIG. 13 illustrates an embodiment of a user interface 1300 displayed by a device that has received information related to an asset within a close proximity of the device. The information transmitted by the event notification system at operation 1008 may be used by the device to generate a visual warning, such as a flash, by overlaying the screen with a transparent color (e.g., red, blue, green, etc.) such that a user's attention is drawn to the screen. In such embodiments, the color illumination is transparent to allow the user to still see a map displaying the location of both the user and the event and/or asset. The color used may be dependent on the type of warning. Furthermore, as illustrated in user interface 1300, textual input may be displayed alerting the user of the type of event and or asset ("Police") and the direction of the event and/or assets approach ("Front-Right"). Other types of direction indications may include, but are not limited to: "Front," "Front-Right," "Right," "Back-Right", "Back," "Back-Left," "Left," "Front-Left," "North," "East," "South," "West" or any combination of cardinal directions, "Forward," "Rear," nautical terms, etc. One of skill in the art will appreciate that any type directional information may be displayed on user interface 1300 without departing from the scope of the present disclosure. The inclusion of these visual cues draws the user's attention to the approaching event and/or asset and help the user avoid an accident related to the event and/or asset. FIG. 15 is yet another embodiment of a user interface 1500 that may be generated by a device upon receiving information from an event notification system at operation 1008.

In further embodiments, information regarding an audible warning may also be transmitted to the device at operation 1008. In one embodiment, the information may comprise an instruction for the device to activate an alarm or a stored audible instruction. In yet another embodiment, the information may comprise the audio instruction itself. For example, event notification system may send a recorded or live audible message regarding event and/or asset at operation 1008. Upon transmission of the information at operation 1008, the method 1000 terminates.

Although not shown in FIG. 10, the event notification system, or any other device, may perform the method 1000 on a continuous basis. As discussed, the user's device, the event and/or the assets may be continuously moving. Furthermore, in embodiments, the event information sent at operation 1008 may vary depending on the proximity of the device to the event and/or asset. Because of this, the method 1000 may be continuously monitored to determine the proximity of the device to the event and/or asset to determine whether different information or no information at all should be sent to the device at operation 1008 as the position between the device and the events and/or assets change.

In certain circumstances, it is not desirable to transmit the location of an asset, such as a police car, to users. For example, the police car may be responding to the scene of a crime and displaying its location may tip off criminals fleeing the scene of the crime. In order to avoid this situation, an asset and/or event may be "cloaked." For example, the data representing the asset or event at the event notification system may include a flag indicating that the asset or event is cloaked. If the asset or event is cloaked, the event notification system will not send information regarding the event or asset to the device at operation 1008 even if the device and the asset and/or event are within a proximate range of each other that would normally trigger the event notification system to send information regarding the event. Cloaking information may be stored with the event and asset data and operated upon as described with respect to FIGS. 1-5.

In one embodiment, an individual asset may indicate that it should be cloaked. For example, a police car communicating with the event notification system may select an option to cloak the vehicle so it does not appear on user devices. In another embodiment, the type of event may indicate whether an asset should be cloaked. For example, some events, such as a crime in process, should be cloaked in order to allow the police to respond without tipping off the suspects. In such embodiments, the cloaked status may be tied to the event ID of the event, as discussed in FIG. 1. In such embodiments, the event itself and any assets responding to the event may be cloaked by the event notification system. In these situations, data related to the event and the assets is not transmitted at operation 1008.

Figure 11:
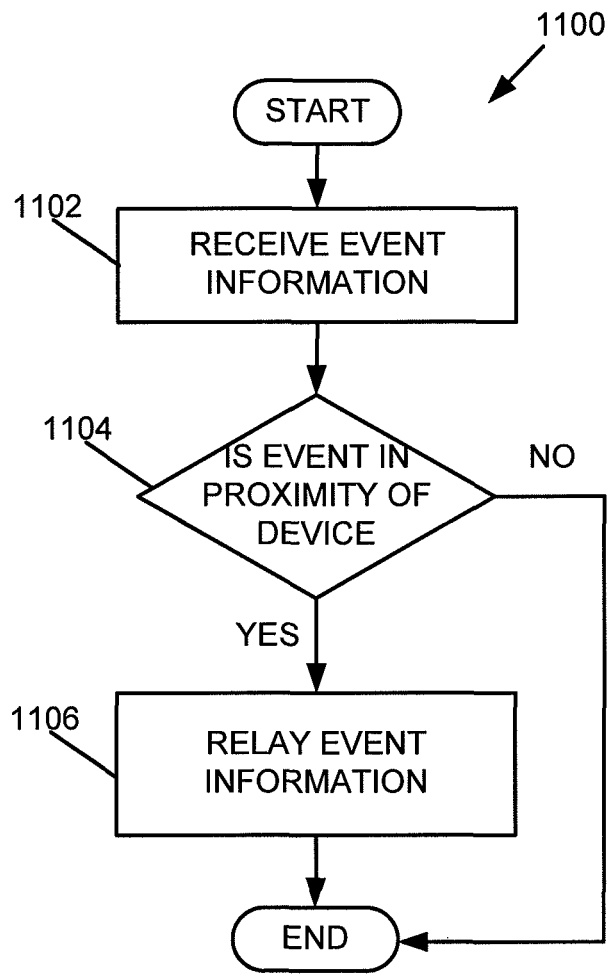
FIG. 11 is a flow chart representing an embodiment of a method 1100 for determining whether a navigation application or device displays event information.

FIG. 11 is a flow chart representing an embodiment of a method 1100 for determining whether a navigation application or device displays event information. For example, in some embodiments, an event notification system may broadcast all event and asset information. In such embodiments, the device must decide which events to display to the user. Displaying all events to the user will result in providing too much information to the user and make the event notification user interface too hard to read and interpret. Therefore, in embodiments in which all information is broadcast to all devices, it is up to the individual device to determine the relevant information for display.

Flow begins at operation 1102 where the device, such as, but not limited to, personal navigation device 120 (FIG. 1) receives event notification information from the event notification system, such as system 100 (FIG. 1) and event notification component 106 (FIG. 1). In embodiments, event notification information contain information about events, assets, or both events and assets. Upon receiving the data, flow continues to decision operation 1104 where the device determines if the event notification information, which events and assets, are in a related proximity to the device. If the events and/or assets are in a related proximity to the device, then they are more likely to be information that the user is interested.

In embodiments, the proximity is defined by the device. For example, predefined proximity ranges may be defined and stored on the device. The predefined ranges may be associated with certain types of events or assets. In such an embodiment, if the event or asset is within the predetermined proximity range, the device will display information related to the event or asset. In another embodiment, the proximity may be dynamically determined by the device. For example, the device may display all events and assets within the current scope of the map displayed on the device. One of skill in the art will appreciate that any number of methods and means for determining a related proximity may be employed with the method 1100 without departing from the scope of the present disclosure.

If the event and/or asset information is not within proximity of the device, flow branches NO and the method 1100 terminates. On the other hand, if the event and/or asset information is within proximity of the device, then flow branches YES to operation 1106. At operation 1106, the device relays the information related to the device to the user. In one embodiment, the device may relay the information by via an audio component. For example, the device may play live and/or recorded data to the user. In another such embodiment, the device may relay information by transmitting an audio warning. In further embodiment, the device may relay the information to the user by generating a visual display. For example, the device may display the information to the user via a user interface such as the example embodiment user interfaces provided in FIGS. 11-15. In addition to providing visual information on the user interface, the device may also provide audible warnings or alerts to the user.

Figure 14:
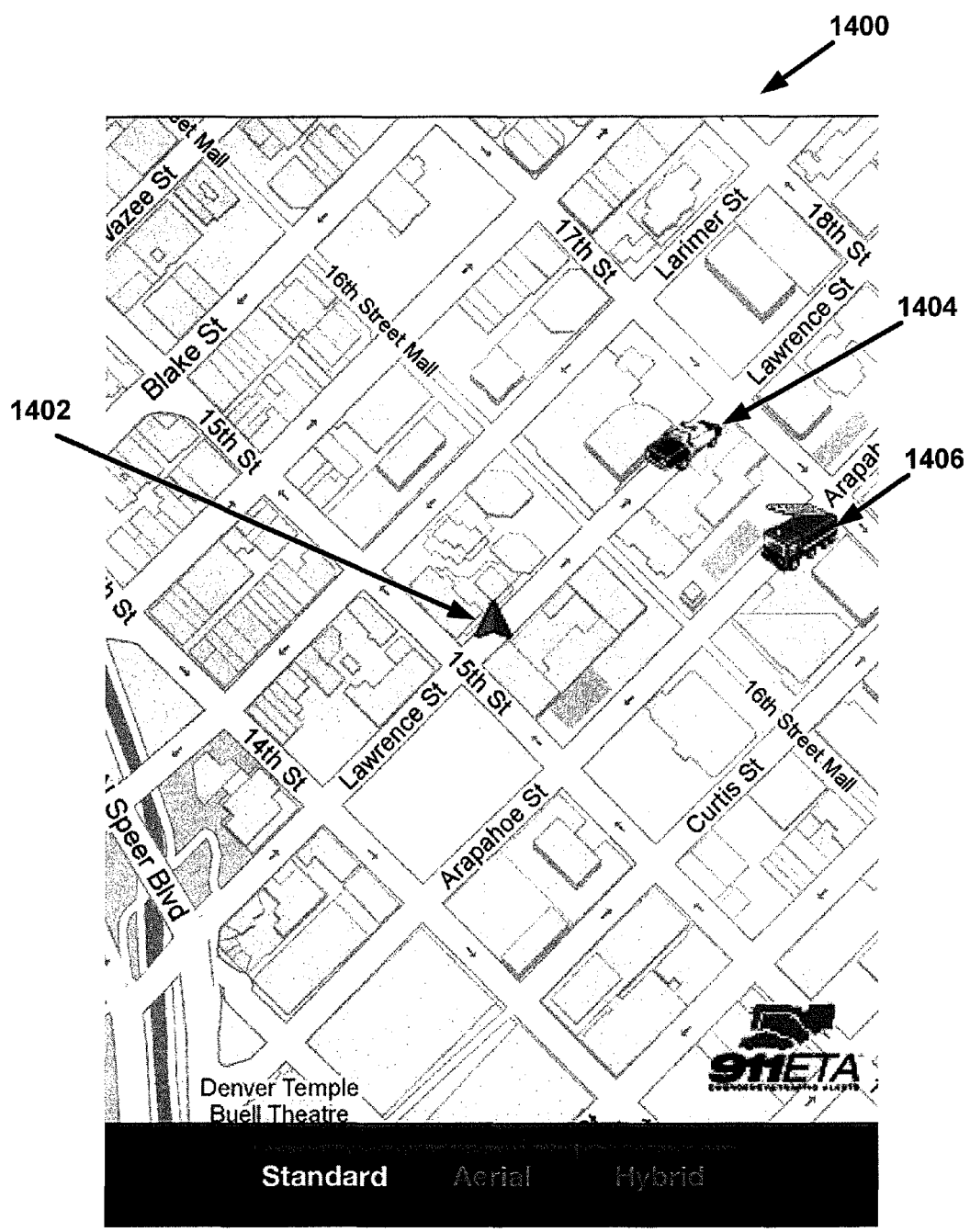
FIG. 14 is another embodiment of a user interface 1400 of map displayed in FIG. 13 without the alert overlay.

In embodiments, the device, rather than the event notification system, determines whether or not to display an alert, such as the alerts illustrated in FIGS. 13 and 14. In such embodiments, the device may determine that an asset and/or event is in close proximity to the and travelling towards the user and provide the user with instructions regarding the direction that the asset and/or event is approaching from. For example, the device may overlay a displayed may with a transparent color such that the map is still visible and display an indication of the type of asset approaching and the direction it is approaching from, as illustrated in FIGS. 13 and 14. In still further embodiments, the device may also display the location of the user on the map in addition to the location of any events or assets, as illustrated in FIG. 14. The location of the user is displayed via a marker or indication on the map, such as marker 1402 in FIG. 14.

Although not shown, method 1100 may also be continuously in a loop by the device. In some embodiments, the device is constantly receiving event information from an event notification system. In such embodiments, method 1000 may be continually repeated to determine which events and assets are relevant and should be displayed and which should not.

FIGS. 12-15 provide example embodiments of user interfaces that may be employed with the systems and methods disclosed herein. For example, the user interface embodiments of FIGS. 12-15 may be displayed on a personal navigation device 120 (FIG. 1) or a general computing device that is a part of the systems or performing the methods disclosed herein. In embodiments, the background of the user interface is a map. As displayed in FIGS. 13-15, the user interface may further provide options for the user to display a certain type of map, as indicated by the "Standard," "Aerial," and "Hybrid" buttons. For example, a user can display a standard map by selecting the "Standard" button, an aerial view map by selecting the "Aerial" button, or a hybrid map by selecting the "Hybrid" button. While these options are shown in the embodiments illustrated in FIGS. 13-15, one of skill in the art will appreciate that other types of map views may be employed with the user interfaces disclosed herein.

FIG. 12 is an embodiment of a user interface 1200 displaying a large map area. As shown in this embodiment, all events, such as construction event 1204 indicated by the barricade marker, and assets, such as fire truck asset 1202 indicated by the fire truck marker, that are located within the map area are displayed. Although not possible to show in a screen shot, the assets, such as fire truck asset 1202 may be moving. In such embodiments, the marker marking the position of the asset may travel along the map to indicate the real-time position of the asset. Furthermore, while only construction and fire truck assets are displayed in embodiment user interface 1200, other types of events or assets may be similarly displayed. Furthermore, other types of assets may be indicated by a separate marker (e.g., police car icon for police cars, ambulance icon for ambulances, train icon for trains, hazard symbols for accidents, etc.) One of skill in the art will appreciate that any type of icon or marker may be employed with is embodiments of the user interfaces disclosed herein.

FIG. 13 is an example embodiment of a user interface 1300 displaying an alert to the user. In embodiments, user interface 1300 draws the user's attention by flashing the screen in a transparent color (e.g., red, blue, green, or any other color). As illustrated in user interface 1300, the flashing color is transparent such that the user's attention is drawn to the screen. However, the user is still able to see the underlying map including the location of the user and the assets or events. In other embodiments, the flashing color may not be transparent; however, in such embodiments the user no longer has the ability to view the underlying map. Additionally, the type of asset approaching the user is indicated by large text at the top of user interface 1300. Doing so clearly informs the user about the type of emergency vehicle or event he or she should be on the lookout for. In further embodiments, the direction of that the asset is approaching from of the direction of the event may be indicated by text at the bottom of the user interface. This provides the user with information to quickly locate and avoid the asset or event. Furthermore, the flashing color and text provide the additional benefit of alerting the deaf or hearing impaired, who may not be alerted by an audible warning, to the approach of an event or asset, such as, but not limited to, an emergency vehicle.

FIG. 14 is another embodiment of a user interface 1400 of map displayed in FIG. 13 without the alert overlay. In this embodiment, the location of the user is indicated by marker 1402. The location of an approaching police vehicle is indicated by the police car marker 1404. Additionally, a fire truck located a block over is indicated by fire truck marker 1406.

FIG. 15 is yet another embodiment of a user interface 1500 displaying an alert to a user. In embodiments, user interface 1300 draws the user's attention by flashing the screen in a transparent color. The type of asset, a fire truck, is indicated by the "Firetruck" text at the top of user interface 1500. The direction of approach is indicated by the text "Front-Right" at the bottom of the user interface. In other embodiments, the direction of approach may be indicated using cardinal directions, arrows, or any other type of indication.

This disclosure describes some embodiments of the present disclosure with reference to the accompanying drawings, in which only some of the possible embodiments are shown. Other aspects may, however, be embodied in many different forms and should not be construed as limited to the embodiments set forth herein. Rather, these embodiments are provided so that this disclosure is thorough and complete and fully conveyed the scope of the possible embodiments to those skilled in the art.

Although the embodiments have been described in language specific to structural features, methodological acts, and computer-readable media containing such acts, it is to be understood that the possible embodiments, as defined in the appended claims, are not necessarily limited to the specific structure, acts, or media described. One skilled in the art will recognize other embodiments or improvements that are within the scope and spirit of the present disclosure. For example, the systems and methods were described above in the context of pushing real-time data of new events and changes to events to navigation applications so that the navigation application need only display the most recently received data without much or any modification being necessary. In an alternative embodiment, instead of sending changes and thereby updating event information only when a change is detected, for each event the system could send current event information periodically, such as every 30 seconds, for each active event. Other ways of providing real-time information regarding current conditions are also known and could equally be used depending on the preference of the parties involved. Therefore, the specific structure, acts, or media are disclosed only as illustrative embodiments and should not be considered as limiting the scope of this disclosure.

What is claimed is:

1. A method of relaying information on a device, the method comprising:
   receiving event notification information;
   relaying information related one or more assets on the device, wherein the location of the one or more assets are displayed on a map;
   determining that at least one of the one or more assets is in proximity of the device; and
   when at least one of the one or more assets is in geographic proximity of the device, relaying an alert to the user, wherein relaying the alert comprises displaying information to the user via a user interface, and wherein displaying the information further comprises:
      generating a flash, wherein generating a flash comprises overlaying the user interface with a transparent color;
      displaying textual information related to the direction of approach of the at least one of the one or more assets; and
      providing textual information related to the type of the at least one of the one or more assets on the device.

2. The method of claim 1, wherein the textual information related to the type of the at least one of the one or more assets is displayed at the top of the user interface.

3. The method of claim 1, further comprising, when the at least one of the one or more assets is in proximity of the device, playing an audible alert.

4. The method of claim 1, wherein the location of the one or more assets on the map is indicated by a marker, and wherein the marker comprises at least one of:
- a police car;
- a fire truck; and
- an ambulance.

5. The method of claim 1, further comprising displaying information about one or more events on the map.

6. The method of claim 1, wherein one or more events comprise at least one of:
- road maintenance;
- marathons;
- parades;
- traffic signal failure;
- flooded streets; and
- construction.

7. The method of claim 1, further comprising:
- determining that a first asset of the one of the one or more assets is cloaked; and
- withholding information about the first asset.

8. A system for displaying information, the system comprising:
- at least one processor; and
- memory coupled to the at least one processor, the memory containing computer executable instructions that, when executed by the at least one processor, perform a method comprising:
  - receiving event notification information;
  - displaying information related one or more assets on the device, wherein the location of the one or more assets are displayed on a map;
  - determining that at least one of the one or more assets is in proximity of the device; and
  - when at least one of the one or more assets is in geographic proximity of the device, displaying an alert on the user interface, wherein relaying the alert comprises displaying information to the user via a user interface, and wherein displaying the information further comprises:
    - generating a flash, wherein generating a flash comprises overlaying the user interface with a transparent color;
    - displaying textual information related to the direction of approach of the at least one of the one or more assets; and
    - providing textual information related to the type of the at least one of the one or more assets asset on the device.

9. The system of claim 8, wherein the textual information related to the type of the at least one of the one or more assets is displayed at the top of the user interface.

10. The system of claim 8, wherein the method further comprises, when the at least one of the one or more assets is in proximity of the device, playing an audible alert.

11. The system of claim 8, wherein the location of the one or more assets on the map is indicated by a marker, and wherein the marker comprises at least one of:
- a police car;
- a fire truck; and
- an ambulance.

12. The system of claim 8, wherein the method further comprises, displaying information about one or more events on the map.

13. The system of claim 8, wherein the method further comprises:
- determining that a first asset of the one of the one or more assets is cloaked; and
- withholding information about the first asset.

14. A computer storage medium encoding computer executable instructions that, when executed by at least one processor, perform a method of relaying information on a device, the method comprising:
- receiving event notification information;
- relaying information related one or more assets on the device, wherein the location of the one or more assets are displayed on a map;
- determining that at least one of the one or more assets is in proximity of the device; and
- when at least one of the one or more assets is in geographic proximity of the device, relaying an alert to the user, wherein relaying the alert comprises displaying information to the user via a user interface, and wherein displaying the information further comprises:
  - generating a flash, wherein generating a flash comprises overlaying the user interface with a transparent color;
  - displaying textual information related to the direction of approach of the at least one of the one or more assets; and
  - providing textual information related to the type of the at least one of the one or more assets on the device.

15. The computer storage medium of claim 14, wherein the textual information related to the type of the at least one of the one or more assets is displayed at the top of the user interface.

16. The computer storage medium of claim 14, wherein the method further comprises, when the at least one of the one or more assets is in proximity of the device, playing an audible alert.

17. The computer storage medium of claim 14, wherein the location of the one or more assets on the map is indicated by a marker, and wherein the marker comprises at least one of:
- a police car;
- a fire truck; and
- an ambulance.

18. The computer storage medium of claim 14, the method further comprising displaying information about one or more events on the map.

19. The computer storage medium of claim 14, wherein one or more events comprise at least one of:
- road maintenance;
- marathons;
- parades;
- traffic signal failure;
- flooded streets; and
- construction.

20. The computer storage medium of claim 14, the method further comprising:
- determining that a first asset of the one of the one or more assets is cloaked; and
- withholding information about the first asset.

* * * * *